US005931718A

United States Patent [19]
Komanduri et al.

[11] Patent Number: 5,931,718
[45] Date of Patent: Aug. 3, 1999

[54] MAGNETIC FLOAT POLISHING PROCESSES AND MATERIALS THEREFOR

[75] Inventors: Ranga Komanduri; Ming Jiang, both of Stillwater, Okla.

[73] Assignee: The Board of Regents of Oklahoma State University, Stillwater, Okla.

[21] Appl. No.: 08/940,254

[22] Filed: Sep. 30, 1997

[51] Int. Cl.$^6$ .............................. B24B 1/00; B24B 19/00
[52] U.S. Cl. ................................ 451/36; 451/41; 451/113
[58] Field of Search .............................. 451/36, 164, 165, 451/162, 113–163, 11, 28, 41

[56] References Cited

U.S. PATENT DOCUMENTS

| | | |
|---|---|---|
| 3,695,934 | 10/1972 | Feldhaus et al. . |
| 4,306,386 | 12/1981 | Sakulevich et al. . |
| 4,821,466 | 4/1989 | Kato et al. . |
| 4,965,967 | 10/1990 | London . |
| 5,048,238 | 9/1991 | Ikeda . |
| 5,070,658 | 12/1991 | Rajner et al. . |
| 5,185,957 | 2/1993 | Mizuguchi et al. . |
| 5,214,884 | 6/1993 | Kinoshita et al. . |
| 5,384,989 | 1/1995 | Shibano . |
| 5,449,313 | 9/1995 | Kordonsky et al. . |
| 5,460,566 | 10/1995 | Trahan . |
| 5,575,706 | 11/1996 | Tsai et al. . |
| 5,577,948 | 11/1996 | Kordonsky et al. . |

OTHER PUBLICATIONS

Childs, et al.; Magnetic Fluid Grinding of Ceramic Balls, *Tribology Int.'l*, vol. 28, No. 6, 00. 341–348, 1995.

Umehara, et al.; Principles of Magnetic Fluid Grinding of Ceramic Balls; *Applied Electromagnetics in Materials* 1 (1990) pp. 37–43.

Raghunadan, et al.; Magnetic Float Polishing of Ceramics; *Journal of Manufacturing and Science and Engineering*, vol. 119, pp. 001–009, Aug. 1997.

Komanduri, et al.; On the Possibility of Chemo–Mechanical Action in Magnetic Float Polishing of Silicon Nitride; *Journal of Tribology*, vol. 118, pp. 721–727, Oct. 1996.

Bhagavatula et al.; On chemical polishing of $Si_3N_4$ with $Cr_2O_3$; *Philosophical Magazine*, 1996 vol. 74, No. 4, 1003–1017.

Fox, et al, "Magnetic Abrasive Finishing of Rollers," *Annals of the CIRP* vol. 43/I/1994.

N. Umehara et al., Magnetic fluid grinding of HIP–$Si_3N_4$ rollers, WEAR, 00 (1995) 000–000, pp. 1–8.

*Primary Examiner*—David A. Scherbel
*Assistant Examiner*—Philip J. Hoffmann
*Attorney, Agent, or Firm*—Fellers, Snider, Blankenship, Bailey & Tippens, P.C.

[57] ABSTRACT

A methodology for finishing of HIP'ed $Si_3N_4$ balls from the as-received condition by magnetic fluid polishing. It involves mechanical removal of material initially using harder abrasives with respect to the work material (of different materials of progressively lower hardnesses and finer grain sizes) followed by final chemo-mechanical polishing (CMP) using preferably a softer abrasive for obtaining superior finish with minimal surface or subsurface defects, such as scratches, microcracks, or pits on the $Si_3N_4$ balls. High material removal rates (1 $\mu$m/min) with minimal subsurface damage is obtained with harder abrasives, such as $B_4C$ or $SiC$ (relative to $Si_3N_4$) due to the use of a flexible support system, small polishing loads (1N/ball), and fine abrasives but high polishing speeds (compared to conventional polishing) by rapid accumulation of minute amounts of material removed by microfracture. Final polishing of the $Si_3N_4$ balls using a softer abrasive, such as $CeO_2$ (that chemo-mechanically react with the $Si_3N_4$ work material) results in high quality $Si_3N_4$ balls of bearing quality with a superior surface finish and damage-free surface.

12 Claims, 15 Drawing Sheets

CeO₂ (5 μm) ABRASIVE

MAGNETIC FLOAT POLISHING PROCESSES AND MATERIALS THEREFOR

STATEMENT REGARDING FEDERALLY SPONSORED RESEARCH

Work performed in connection with the development of the present invention was sponsored by grants from the National Science Foundation on "Tribological Interactions in Polishing of Advanced Ceramics and Glasses," (CMS-9414610), "Design, Construction, and Optimization of Magnetic Field Assisted Polishing," (DMI-9402895), and DoD's DEPSCoR Program on "Finishing of Advanced Ceramics" (DAAH04-96-1-0323). This project was initiated by an ARPA contract on "Ceramic Bearing Technology Program" (F33615-92-5933). The government may have rights in this invention.

BACKGROUND OF THE INVENTION

1. Field of the Invention

This invention relates generally to magnetic float polishing and, more specifically, to a methodology for obtaining superior finish on ceramic balls using both mechanical and chemo-mechanical action in magnetic float polishing. The invention also encompasses chemo-mechanical polishing agents used in the processes.

2. Background

The development of high-performance ceramics (or advanced ceramics) is stimulating major advances in a large spectrum of industries including machine tools, electronics, manufacturing engineering, and chemical and metallurgical processing. Alumina ($Al_2O_3$), zirconia ($ZrO_2$), silicon carbide (SiC) and silicon nitride ($Si_3N_4$) are the most important advanced ceramic materials among high-performance ceramics with $Si_3N_4$ being the most promising material in this category for advanced structural bearing applications. Ceramic bearings offer significant improvements in performance and durability for a wide variety of applications ranging from inertial guidance systems to precision gimbals to turbine engine exhaust nozzle actuators and submarine pumps. Hybrid bearings with silicon nitride balls have made 100,000 rpm a possibility for high speed machine tool spindles. This is principally due to higher rigidity and greater precision associated with these bearings.

A critical factor affecting the performance and reliability of ceramics for bearing applications is the quality of the resulting surface by polishing. In fact, non-uniform grinding and polishing techniques have been identified recently by the U.S. Department of Defense as a principal barrier to the greater use of ceramics. It is well known that ceramics are extremely sensitive to surface defects resulting from grinding and polishing processes owing to their high hardness and inherent brittleness. Since fatigue failure of ceramics is driven by surface imperfections, it is paramount that the quality and finish of the ceramic bearing elements be as smooth as possible with minimal defects so that reliability in service and improvements in the performance of the bearings can be achieved.

Due to their hardness and brittleness, most advanced ceramic materials are extremely difficult to shape and finish. Unlike the situation with metals, plastic deformation is not the preferred mode of material removal. Instead, material removal is by brittle fracture. Consequently, with conventional grinding and polishing techniques surface damage is inherently present on the workpiece in the form of pits and scratches, and subsurface damage in the form of lateral and radial cracks. These defects affect the performance and reliability of the products in service.

Conventional polishing of ceramic balls generally uses diamond abrasive, high load, and low polishing speeds (maximum of a few hundred rpm). This is basically the same technology that is used for finishing metal balls extended to the finishing of ceramic and glass balls. This is in spite of the fact that different mechanisms are involved in the material removal processes due to difference in material characteristics and their response to polishing conditions. Considerable time is expended (estimates vary from some 4–6 weeks to 12–16 weeks depending on the size of the balls, the quality requirements, and the manufacturing technology practices) to finish a batch of ceramic balls. The long processing times and the use of expensive diamond abrasive result in high processing costs. Application of diamond abrasive under high loads in conventional polishing often results in deep scratches, pits, and microcracks on the surface of the polished balls. Consequently, performance in service and reliability are major concerns with the conventional polishing of ceramics. To address these problems, need arises for an alternate technique that minimizes the defects and other disadvantages associated with conventional material removal processes.

SUMMARY OF THE INVENTION

The present invention utilizes a magnetic float polishing process in a single chamber, multi-staged approach combining mechanical and chemo-mechanical polishing actions to rapidly polish workpieces, and particularly ceramic workmaterials such as $Si_3N_4$ balls, without employing hard diamond abrasives, and to obtain a superior finish having minimal surface or subsurface defects, such as scratches, microcracks or pits. The processes utilize roughing abrasives for primarily mechanical action having a hardness not significantly greater than the hardness of the workmaterial and chemo-mechanical abrasives for finishing having a hardness significantly less that of the workmaterial.

Magnetic float polishing (MPF), sometimes termed magnetic fluid grinding, is a "gentle" polishing technique based on the magneto-hydrodynamic behavior of a magnetic fluid that can float non-magnetic abrasives suspended in it. The magnetic fluid is generally a colloidal dispersion of extremely fine (100 to 150 Å) sub-domain ferro-magnetic particles, usually magnetite ($Fe_3O_4$), in various carrier fluids, such as water or kerosene. The ferrofluids are made stable against particle agglomeration by the addition of surfactants. When a magnetic fluid is placed in a magnetic field gradient, it is attracted towards the higher magnetic field side. If a non-magnetic substance (e.g., abrasives in this case) is mixed in the magnetic fluid, it is discharged towards the lower side. When the field gradient is set in the gravitational direction, the non-magnetic material is made to float on the fluid surface by the action of the magnetic levitational force. The process is considered highly effective for finish polishing because the levitational force is applied to the abrasives in a controlled manner. The forces applied by the abrasives to a part such as a ceramic ball set in the fluid are extremely small (about 1N or less). The time required to finish the balls to the same accuracy or better by this technique is at least an order of magnitude faster than by conventional polishing techniques.

It has been suggested that magnetic fluid polishing or grinding is more likely to replace the roughing stage of conventional finishing rather than final polishing. The present invention, however, utilizes magnetic float polishing techniques in a rapid single chamber, multi-staged process to efficiently and cost effectively produce high quality ceramic balls for bearing applications. The invention involves an initial stage of mechanical removal of material using harder abrasives with respect to the workmaterial (of different materials of progressively lower hardnesses and finer grain sizes) followed by final chemo-mechanical polishing (CMP) using preferably a softer abrasive for obtaining superior finish with minimal surface or subsurface defects, such as scratches, microcracks, or pits on the $Si_3N_4$ balls. High material removal rates (1 μm/min) with minimal subsurface damage is obtained with harder abrasives, such as $B_4C$ or SiC (relative to $Si_3N_4$) due to the use of a flexible support system, small polishing loads (1N/ball), and fine abrasives but high polishing speeds (compared to conventional polishing) by rapid accumulation of minute amounts of material removed by microfracture. Final polishing of the $Si_3N_4$ balls using a softer abrasive which chemo-mechanically reacts with the $Si_3N_4$ workmaterial results in high quality $Si_3N_4$ balls of bearing quality with a superior, damage free surface finish (Ra<4 nm, Rt<0.04 μm).

In another aspect of the invention, cerium oxide ($CeO_2$) is found to be the most preferred chemo-mechanical polishing agent for use in connection with these processes. $CeO_2$ appears to be the most effective polishing medium for CMP of $Si_3N_4$ because of the thermodyamic considerations of its reaction with $Si_3N_4$ as well as its kinetic action of removing the reaction product layer, namely, $SiO_2$ from $Si_3N_4$ workmaterial. The kinetic action, which removes the reaction layer from the interface is critical to the CMP process. The chemical reaction can be continued only after the passivating layers are removed continuously by abrasive mechanical action. The $CeO_2$ abrasive reacts chemically (oxidization-reduction reaction) with $Si_3N_4$ workmaterial and leads to the formation of an $SiO_2$ reaction layer. Since the hardness of $CeO_2$ is close to the $SiO_2$ reaction layer and significantly lower ($\approx 1/3$) than the $Si_3N_4$ workmaterial, the $Si_3N_4$ substrate can hardly be scratched or damaged by $CeO_2$ but the $SiO_2$ layer can be removed under subsequent mechanical action of water and $CeO_2$ on the $Si_3N_4$ workmaterial.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention. As will be realized, the invention is capable of modifications in various obvious respects, all without departing from the scope of the invention. Accordingly, the description should be regarded as illustrative in nature and not as restrictive.

Though the invention is described hereunder in connection with the polishing of ceramic balls for bearing applications, and specifically silicon nitride ball blanks, it should be understood that the invention has broader applicability to the polishing of other advanced ceramics such as SiC, $ZrO_2$, $Al_2O_3$ and ceramic composites, and further including the finishing of other materials for use in unrelated fields, one example being zirconia and sapphire balls used in the jewelry industry, and other materials including silicon, quartz, gallium arsenide and various ferrites.

DETAILED DESCRIPTION OF THE PREFERRED EMBODIMENT

Figure 1:
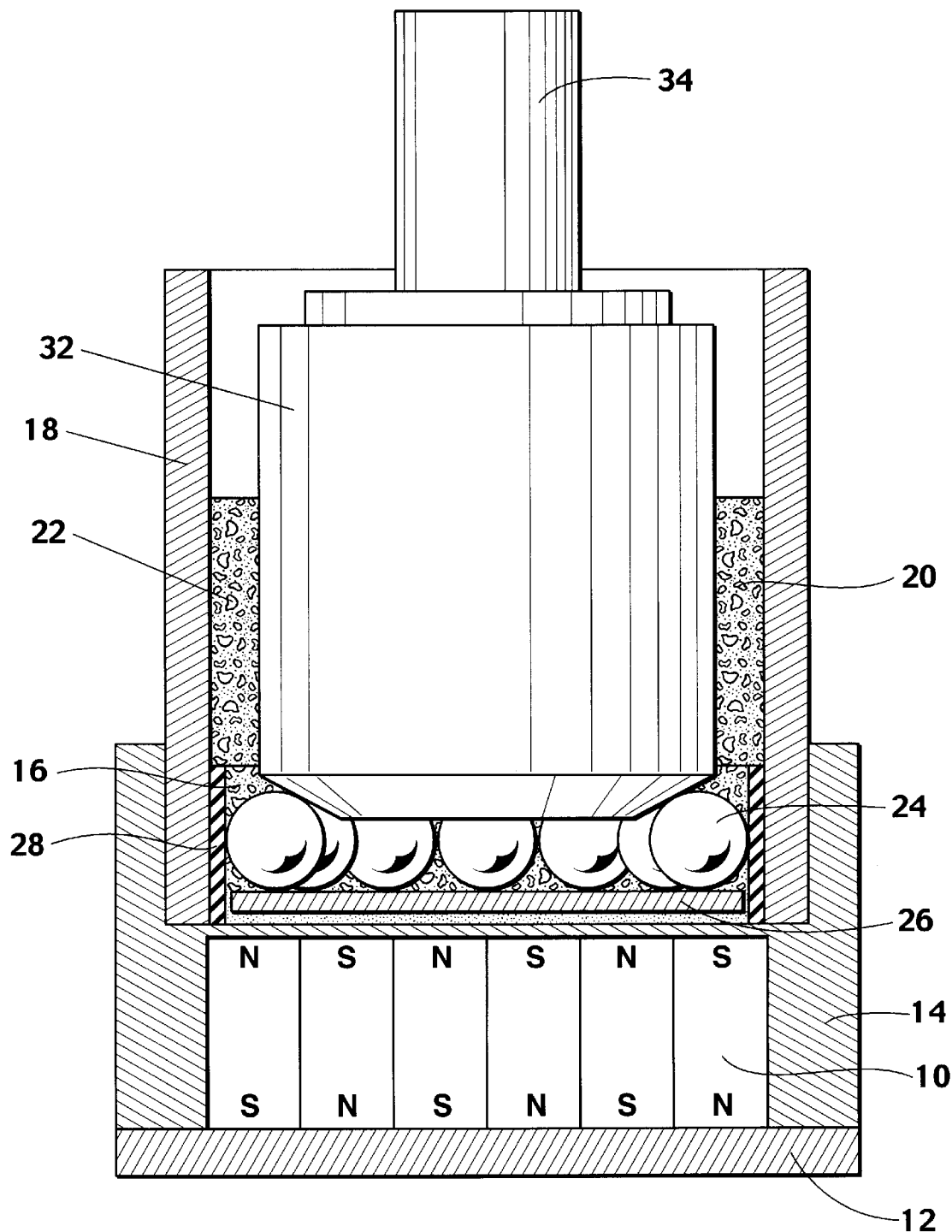
FIG. 1 is a schematic of a magnetic float polishing apparatus for finishing advanced ceramic balls.

FIG. 1 is a schematic of a magnetic float polishing apparatus for finishing advanced ceramic balls. Permanent magnets 10 are supported on a steel yoke 12 within an aluminum base 14. The magnets 10 are located with alternate N and S poles underneath a float chamber 16. Although permanent magnets are illustrated, it is within the scope of the invention to use an electromagnet instead of permanent magnets in order to achieve some flexibility in providing the desired magnetic field. A guide ring 18 is mounted on top of the float chamber 16 to hold a quantity of magnetic fluid 20. The magnetic fluid 20 preferably contains 5–10% by volume of fine abrasive particles 22. Ceramic ball blanks 24 are held in a 3-point contact between an acrylic float 26 at the bottom, a rubber ring 28 glued to the inner surface of the guide ring 18 on the side, and the beveled edge 30 of a drive shaft 32 at the top. The drive shaft 32, made of a non-magnetic austenitic stainless steel, is connected to the spindle 34 of a milling machine or other spindle capable of operating in a high-speed range up to 6,000 to 10,000 rpm. The magnetic fluid 20 is a colloidal dispersion of extremely fine (100 to 150 Å) subdomain ferromagnetic particles, usually magnetite ($Fe_3O_4$), in a carrier fluid, such as water or kerosene. It is made stable against particle agglomeration by coating the particles with an appropriate surfactant.

When a magnetic field is applied, the magnetic particles in the magnetic fluid 20 are attracted downward to the area of higher magnetic field and an upward buoyant force is exerted on all non-magnetic materials to push them to the area of lower magnetic field. The abrasive grains 22, the ceramic balls 24, and the acrylic float 26, all being non-magnetic materials, are levitated by the magnetic buoyant force. The drive shaft 32 is fed down to contact with the balls 24 (3-point contact) and presses them down to reach the desired force or height. The balls 24 are polished by the abrasive grains 22 under the action of the magnetic buoyancy levitational force when the spindle 34 rotates.

As in most finishing operations, there are three stages involved in magnetic float polishing, namely, 1) roughing to remove as much material as possible without imparting serious damage to the surface, 2) an intermediate stage of semifinishing where size, sphericity, and surface roughness have to carefully monitored, and 3) final finishing where all three, namely, size, sphericity, and finish have to closely controlled to meet requirements. Conventional techniques utilize a different apparatus for each stage. In the present invention, however, a single apparatus, indeed a single chamber, i.e. the float chamber 16, is used in a multi-stage process which combines mechanical and chemo-mechanical polishing to rapidly achieve high removal rates and high-performance bearing surfaces.

The initial polishing stage is aimed at removing the normally encountered band or rim on the ceramic ball blank and the reaction layer, thereby reducing the diameter of the blank. This requires a high removal rate so that the ball shape can be improved quickly. In this initial stage, a courser, harder abrasive, such as $B_4C$ (500 grit) and/or SiC (400 grit) (i.e. compared to the $Si_3N_4$ work material), or combination of abrasives is used at a relatively high speed in the range of 2000 to 4000 rpm to reach the desired diameter at high removal rates and at the same time improve the sphericity for proper ball motion. High material removal rates (1–2 $\mu$m/min) with minimal subsurface damage are possible using harder abrasives, such as $B_4C$ or SiC, due to the rapid accumulation of minute amounts of material removed by mechanical microfracture at high polishing speeds and low loads in the MFP process. Although material removal is by brittle fracture, it occurs on a microscale due to low polishing force, flexible float system, and fine abrasives. The cracks generated are localized and suppressed from propagating into microcracks. Consequently, subsurface damage is minimized leading to the higher strength of the workmaterial and reliability of the parts in service.

After reaching a diameter close to the desired diameter, an intermediate (semifinishing) stage is utilized as a transition between the roughing and finishing stages, as the material removal rate is of prime concern in the first stage and surface finish in the final stage. Harder abrasives with a finer grit size are used for this intermediate stage, namely, SiC (1000 grit) and SiC (1200 grit) at speeds in the range of 1000 to 2000 rpm. During this stage, the removal rates are much lower and the finish much better than roughing, but the emphasis during this stage is the improvement of sphericity. In the final intermediate stage (prior to CMP), fine SiC abrasive (8000 grit) is used to approach the required diameter and sphericity and remove almost all the deep valleys from the surface.

The final stage entails polishing using a softer, chemo-mechanical abrasive such as $CeO_2$, $CaCO_3$, MgO, $SiO_2$, $Fe_2O_3$, $Fe_3O_4$ or $Cr_2O_3$, and preferably $CeO_2$, to produce the balls of required diameter, sphericity, and final surface finish which is extremely smooth and almost damage-free by preferentially removing the peaks from the surface. Chemo-mechanical action depends on the availability for a short duration of certain threshold pressure and temperature at the contact zone of the polishing process to enable a chemical reaction layer to be formed by the interaction of the abrasive, workmaterial and the environment. This process is considered tribochemical polishing when there is no superimposed mechanical action. Thus, chemo-mechanical action is very specific and proper choice of the abrasive and the environment should be made for a given workmaterial. Both thermodynamics and kinetics play an important role on the rates of chemical reactions. Once the reaction products are formed, it is removed from the workmaterial by subsequent mechanical action by the abrasive. Since material removal by this mechanism does not depend on the hardness but on the chemical potentials, it is possible to remove material by abrasives substantially softer than the workmaterial. Theoretically any abrasive that can react with the workmaterial in a given environment and form a reaction product can be used for CMP. However, some abrasives may be harder than the workmaterial and some mechanical action may occur in addition to the chemo-mechanical action. Material removal by mechanical action may be satisfactory in roughing, or even semi-finishing but in the final finishing operation it is preferable to minimize the mechanical action that can affect the surface integrity.

A review of literature on chemo-mechanical polishing (CMP) of various materials in general and that of $Si_3N_4$ in particular has been presented by Komanduri et al. in an article entitled "*On the Possiblitiy of Chemo-Mechanical Action in Magnetic Float Polishing of Silicon Nitride*" appearing in Volume 118, pp. 721–727 of the Journal of Tribology (Oct. 1996) and may be referred to for details. Also, the mechanism of chemo-mechanical polishing of $Si_3N_4$ with $Cr_2O_3$ was reported by Bhagavatula and Komanduri, "*On Chemo-Mechanical Polishing of Silicon Nitride with Chromium Oxide Abrasive,*" Philosophical Magazine A, 74/4 (1996), 1003–1017, in that it was shown conclusively that the role of $Cr_2O_3$ was more than that of a mere catalyst (as reported in the literature by other researchers) and that $Cr_2O_3$ does play an active role in the chemical reaction with $Si_3N_4$ forming chromium silicate and chromium nitride. This was shown by examination of the wear debris in the SEM (both the secondary electron images and the energy dispersion X-ray analysis) as well as X-diffraction of the wear debris using a low-angle X-ray diffraction equipment. These two publications are incorporated herein by reference.

In connection with the present invention it is found that $CeO_2$ is an even more superior abrasive than $Cr_2O_3$ in finishing $Si_3N_4$ workmaterial, in that the finish obtained by $Cr_2O_3$ is about 10.7 nm Ra and 0.149 mm Rt, while that with $CeO_2$ is about 3.8 nm Ra and 0.029 mm Rt. Also, very few scratch marks, if any, are found on the $Si_3N_4$ surface when polished with $CeO_2$ even at a magnification of 5,000 to 10,000 with the entire surface being smooth without any pits. This is attributed to the use of significantly softer $CeO_2$ abrasive which will not scratch $Si_3N_4$ in the final polishing.

It is well known that cerium oxide ($CeO_2$) is an efficient polishing agent for glass. It is also known that the fluid medium in which it is used is also very critical. For example, when polishing glass, $CeO_2$ is particularly effective in water and in alcohols only when hydroxyl groups are present. Thus cerium oxide slurry in water is invariably used for polishing. The oxide contains polyvalent cerium atoms, Ce(IV) and Ce(III), which can provide chemical action with the workmaterial. It appears that when $Ce(OH)_4$, i.e. $CeO_2 \cdot 2 H_2O$ is precipitated fresh, i. e. in situ, in the polishing slurry form, a soluble Ce(IV) salt is probably involved in an equilibrium reaction:

$$SiO_2 + Ce(OH)_4 \rightarrow CeO_2 + Si(OH)_4$$

The breaking and reforming of Si-O bonds is perhaps aided by the transfer of OH groupings to incipient fracture sites by a transport mechanism using the relatively large and mobile coordination sphere around oxophilic cerium atom.

Cerium is the most abundant element of the rare earths and ranks around 25th in the listing of abundance in the earth's crust of all the naturally occuring elements. So, Cerium is not particularly rare as compared to nickel or copper. Cerium oxide has a high melting temperature (2750 K) but is a very soft material (Mohs hardness: 5–6) and hence cannot scratch $Si_3N_4$. Cerium ions are present in two stable valence states, namely, the tetravalent $Ce^{4+}$(Ceric) and the trivalent $Ce^{3+}$(Cerous). The tetravalent cericion is a strong oxidizing agent but can be reduced by ferrous salts, hydrogen peroxide. When associated with oxygen, it is completely stable as $CeO_2$. $Ce_2O_3$ is unstable in air, water, and the like and readily converts to $CeO_2$. Ceria has the $CaF_2$ structure with 8-coordinate cations and 4-coordianate anions. It can be visualized as a close-packed cubic array of metal atoms with oxygen filling all the tetrahedral holes. Ceria has been tested for acute effects and found to have very low toxicity. Hence, its use is safe from an environmental point of view.

The preferred embodiment of the present invention is best illustrated through the following examples conducted on hot isostatic pressed (HIP'ed) $Si_3N_4$ balls (CERBEC NBD-200 from Norton Advanced Ceramics) in the as-received condition having a nominal diameter of 13.4 mm. These balls also contained nearly a 200 μm thick ×5 mm wide band of material around the periphery at the parting plane resulting from the HIP process. The balls were to be finished to a final size of 12.7 mm (0.5 inch), a sphericity of 0.5 μm, and best finish achievable. The large difference in the diameter between the as-received condition to the final size required is made necessary in order to remove all the reaction material that is formed on and near the surface during the HIP'ing process.

Table I and Table II give the nominal chemical composition and the mechanical properties, respectively of the $Si_3N_4$ (NBD 200) balls, and Table III gives various properties of the abrasives used. Table IV lists the test conditions used for the different stages of polishing.

TABLE I

Chemical Composition of NBD-200 Silicon Nitride

| Al | C | Ca | Fe | Mg | O | $Si_3N_4$ |
|---|---|---|---|---|---|---|
| ≦0.5 | ≦0.88 | ≦0.04 | ≦0.17 | 0.6–1.0 | 2.3–3.3 | 77.1–94.1 |

TABLE II

Mechanical and Thermal Properties of $Si_3N_4$ Workpiece

| PROPERTY | VALUE |
|---|---|
| Flexural Strength, MPa | 800 |
| Weibull Modulus | 9.7 |
| Tensile Strength, MPa | 400 |
| Compressive Strength, GPa | 3.0 |
| Hertz Compressive Strength, GPa | 28 |
| Hardness, Hv (10 kg), GPa | 16.6 |
| Fracture Toughness, $K_{1c}$, $MNm^{-3/2}$ | 4.1 |
| Density, $g/cm^2$ | 3.16 |
| Elastic Modulus, GPa | 320 |
| Poisson's Ratio | 0.26 |
| Thermal Expansion Coefficient at 20–1000° C.,/° C. | $2.9 \times 10^{-6}$ |
| Thermal Conductivity at 100° C., W/m-K | 29 |
| Thermal Conductivity at 500° C., W/m-K | 21.3 |
| Thermal Conductivity at 1000° C., W/m-K | 15.5 |

TABLE III

Properties of Various Abrasives

| Abrasive | Density $g/cm^2$ | Knoop Hardness $kg/mm^2$ | Elastic modulus GPa | Melting point, ° C. |
|---|---|---|---|---|
| $B_4C$ | 2.52 | 2800 | 450 | 2450 |
| SiC | 3.2 | 2500 | 420 | 2400 |
| $CeO_2$ | 7.13 | 625 | 165 | 2500 |

TABLE IV

Test Conditions

| Stage | Type | Abrasive Grit Size | Size (μm) | Abrasive, vol % | Speed, rpm | Load, N/ball | Time, min | Remarks |
|---|---|---|---|---|---|---|---|---|
| 1 | $B_4C$ | 500 | 17 | 10% | 2000 | 1.0 | — | Roughing |
|   | SIC | 400 | 23 | 10% | 2000 | 1.0 | — | (High Material Removal) |
| 2 | SiC | 1000 | 5 | 10% | 2000 | 1.0 | 30 | Semi-finishing |
|   | SiC | 1200 | 3 | 10% | 2000 | 1.0 | 30 | (Material Removal and Sphericity) |
| 3 | SiC | 8000 | 1 | 5% | 4000 | 1.2 | 60 | Final Finishing |
|   | $CeO_2$ |   | 5 | 10% | 2000 | 1.2 | 120 | (Size, Sphericity, and Finish) |

*All abrasives used, except $CeO_2$, were obtained from Norton Co. $CeO_2$ is obtained from Aldrich Chemicals.

The MFP apparataus utilized is that illustrated in FIG. 1. The drive shaft 32 was driven by a high-speed, high-precision air bearing spindle 34 with a stepless speed regulation up to 10,000 rpm. The magnetic field was measured by a Gauss/Tesla meter. The pH value of the polishing environment was measured by a pH/Temperature meter. The polishing load was set up by measuring the normal force with a Kistler's piezoelectric dynamometer connected to a charge amplifier and a display. To calculate material removal rates, the weight reduction in the balls was measured by measuring the weight before and after polishing at every stage test using a precision balance. The surface finish of the polished balls was analyzed using a Form Talysurf 120 L, ZYGO laser interference microscope, a Digital Nanoscope III atomic force microscope (AFM), and an ABT 32 scanning electron microscope (SEM).

The finished balls are characterized for roundness using a TalyRond 250 (cut-off: 50 upr, Filter: 2CR), and for surface features using a scanning election microscope (SEM), a Form TalySurf 120 L (cut-off: 0.25 mm and 0.8 mm, evaluation length: 4–6 consecutive cutoff, Filter: ISO 2CR), and an AFM. Although the latter three instruments measure or illustrate slightly different surface features, they are basically complimentary in nature. Their combined use provides confidence on the data obtained. In these examples, three randomly selected balls from each batch are traced 3 times at approximately three orthogonal planes using the TalyRond and Form Talysurf to provide the roundness and surface roughness, respectively. The TalyRond trace measures the maximum departure from a true circle of assumed magnitude and as such it denoted roundness. The sphericity of each ball, according to ABMA, is defined as the maximum value of the roundness measured on three orthogonal planes of the ball. Similarly, the surface finish of each ball is taken as the maximum value of three traces along three orthogonal planes of the ball.

The surface roughness obtained by mechanical polishing generally has a symmetrical profile. However, when the peaks are smoothed preferentially leaving the valleys intact, as in CMP of finishing of $Si_3N_4$, giving a fairly smooth bearing surface, the surface roughness can be unsymmetrical. Many parameters have been proposed to quantify the various surface characteristics. It is necessary to ensure that these values truly represent the surface features of interest. It is generally recognized that Ra alone is not enough to evaluate the surface finish and that both Ra and Rt (or Rmax) may be necessary. The Ra value represents the average roughness and is a typical value of the measured surface, but information regarding the shape of the irregularities (such as deep surface defects) is averaged out. The Rt value is the vertical distance between the highest and lowest points of the roughness profile. It is not a typical value for the whole surface, but can directly represent the irregular surface defects, such as scratches and pits (deep valleys), which can have a significant effect on the surface quality of advanced ceramic materials (Rt=Rp+Rv=Rpv) for various applications.

For a stylus instrument, such as TalySurf, the stylus size and shape affect the accuracy of the profile. It would not be possible to trace the complete profile of a deep valley especially the bottom if the size of the valley is smaller than the tip radius. The stylus tip radius of TalySurf 250 used in this study is ≈2 μm. However, SEM micrographs can be helpful to identify whether there are surface defects which can be reflected by stylus of TalySulf and whether the value from TalySurf is reliable for a small-damage surface. Talysulf is convenient to use for large area scanning with help by SEM micrograph. The surface finish was also checked by ZYGO laser interfere microscope which is a non-contact measurement instrument. For the ZYGO laser interference microscope, the focus range is important and should include both peaks and valleys of the polished surface. Otherwise, the surface values from ZYGO are unreliable. The stylus tip radius of AFM is<0.08 μm and can easily be broken and not easy to be operated and used very often. AFM is used for final high magnification evaluation of some random areas. Based on the evaluation by all of Talysurf, SEM, ZYGO and AFM characterization techniques, one can be more confident that the surface finish value shown are a reliable representation of the true surface quality.

Figure 2A:
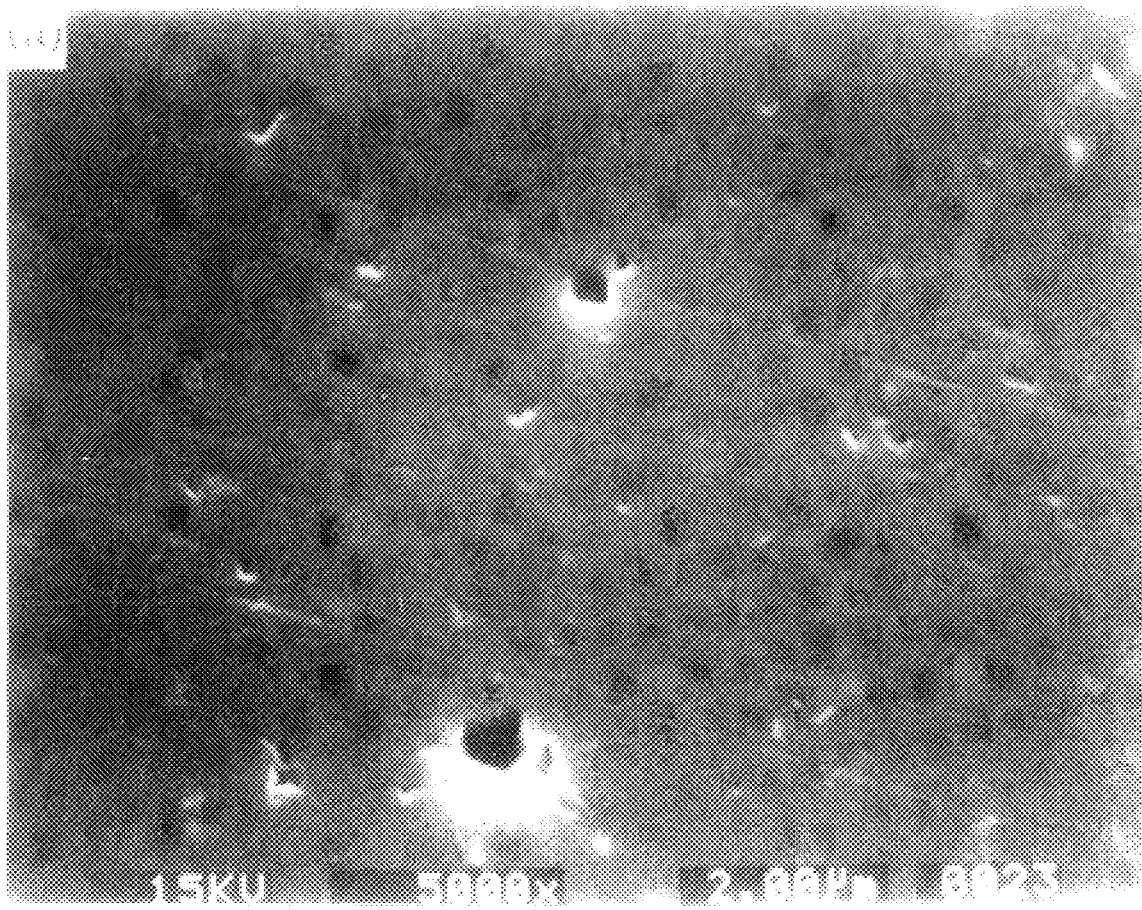
FIG. 2(a) is an SEM image of a commercially finished $Si_3N_4$ ball surface.
Figure 2B:
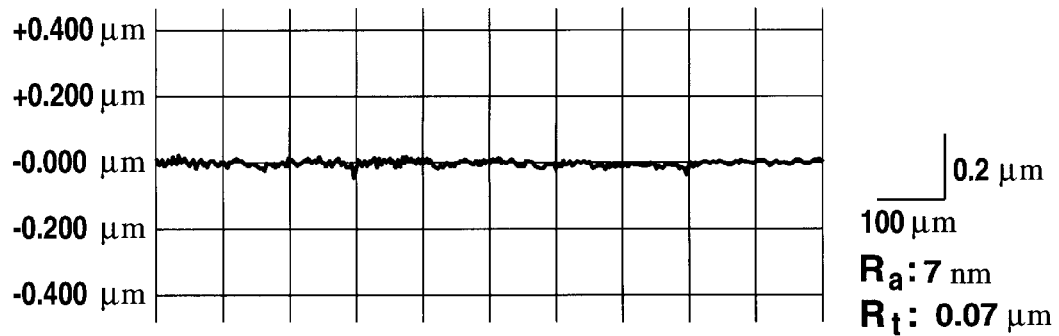
FIG. 2(b) is a Talysurf surface roughness profile of a commercially finished $Si_3N_4$ ball surface.
Figure 4B:
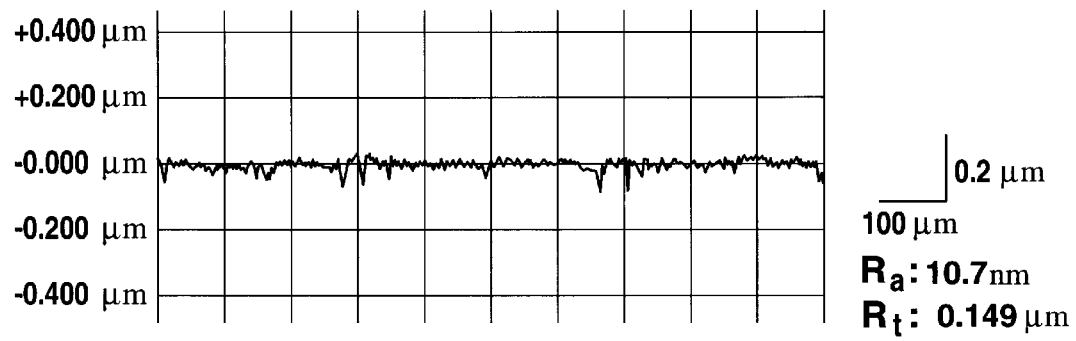
FIG. 4(b) is Talysurf surface roughness profile of a $Si_3N_4$ ball surface finished by $Cr_2O_3$ abrasive.
Figure 5F:
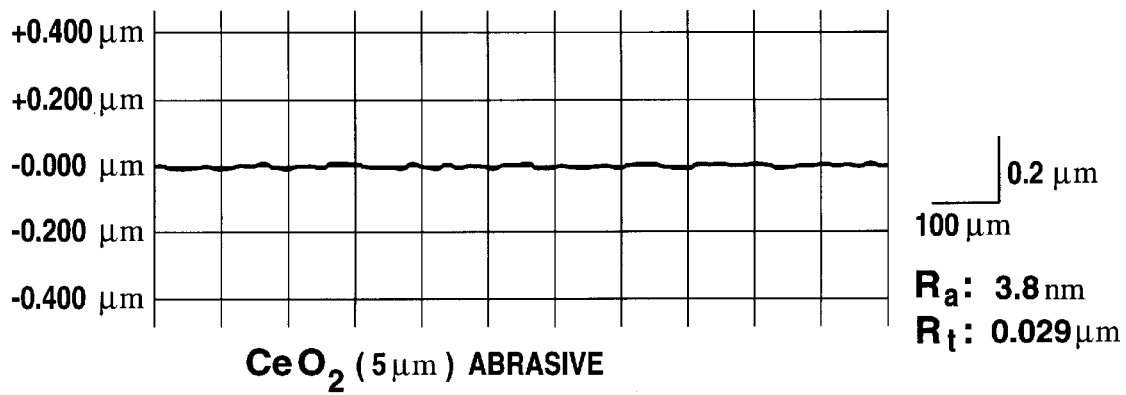
FIG. 5(a)–(f) are TalySurf surface roughness profiles of a $Si_3N_4$ ball after polishing by (a) $B_4C$ (500 grit) abrasive, (b) SiC (400 grit) abrasive, (c) SiC (1000 grit) abrasive, (d) SiC (1200 grit) abrasive, (e) SiC (8000 grit) abrasive, and (f) $CeO_2$ (5 μm) abrasive, respectively.
Figure 2C:
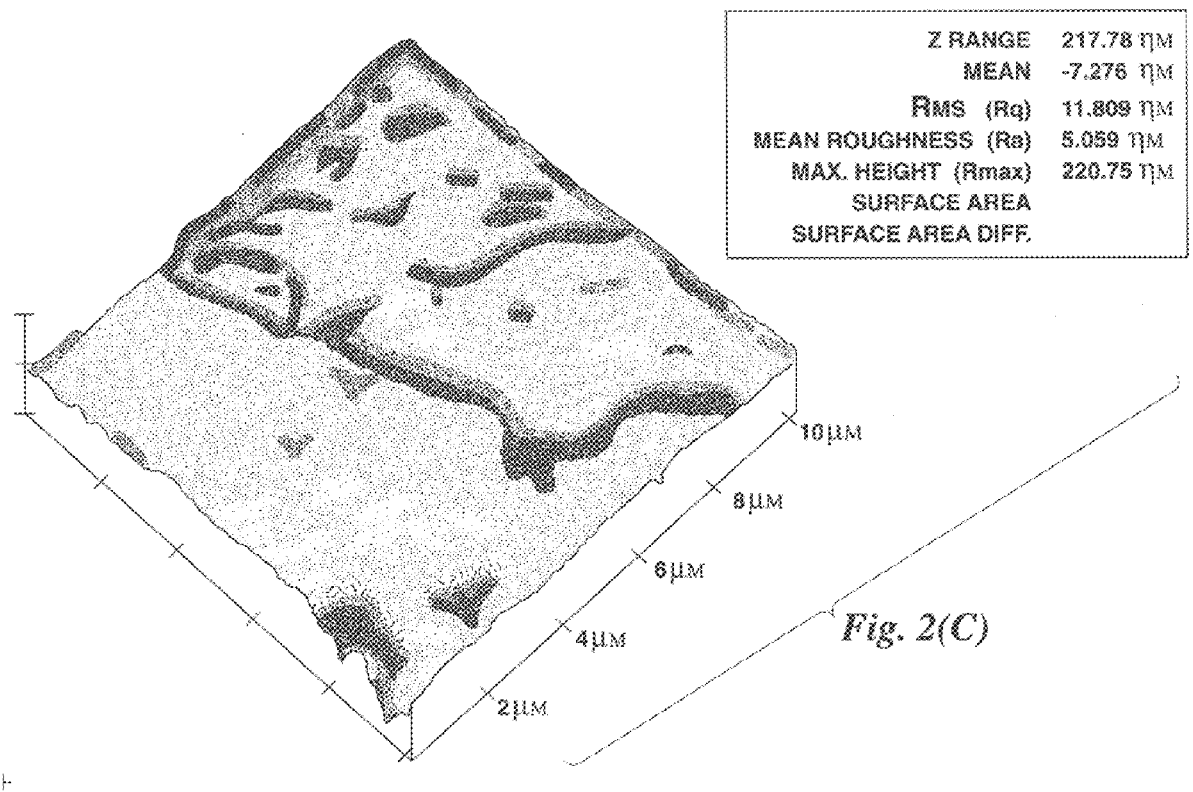
FIG. 2(c) is an AFM image of a commercially finished $Si_3N_4$ ball surface.
Figure 3:
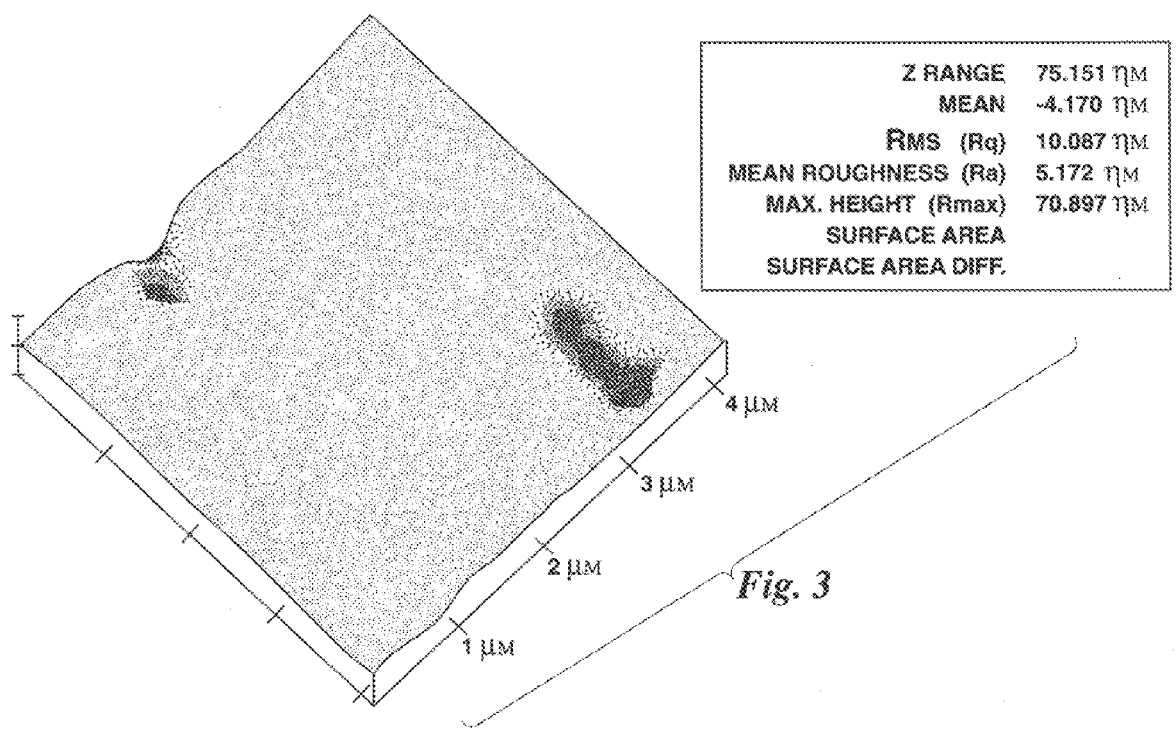
FIG. 3 is an AFM image at higher magnification showing a smooth area separated by pitting of a commercially finished $Si_3N_4$ ball surface.

FIGS. 2(a) to (c) are SEM micrograph, a Form TalySurf profile, and an AFM image, respectively, of a commercially finished best $Si_3N_4$ ball surface (considered as a master ball of ABMA Grade 3). From the SEM micrograph [FIG. 2(a)], it can be seen that while some areas of the surface are extremely smooth, there are many fine scratches and some pits. The AFM image of the polished surface [FIG. 2(c)] more or less shows the same features with an Ra of about 5 nm and Rmax of about 220 nm. Even though the TalySurf profile of the smooth region of the polished surface gives an Ra of around 7 nm and Rt of approximately 70 nm [FIG. 2(b)] this may not reflect the actual surface roughness as can be seen from the SEM image [FIG. 2(a)]. From the SEM image, several deep pits can be seen the size of such defects at the bottom would be smaller than the stylus tip radius (2 μm) of the Talysulf. As previously pointed out, the values obtained by Talysurf, AFM, and ZYGO would depend on their ability to analyze the data from all the peaks as well as the valleys. If the depth of field is not adequate for a given magnification, the data would be in error on account of this. Consequently, care should be exercised in the quantitative evaluation of the surface finish obtained at these magnifications although relative values and surface topography are helpful in the analysis. Hah, Fisher, and Burk, in "*Ceramic Bearing Development-Tribochemical Finishing of Silicon Nitride,*" Vol. 4, Technical Report No. WL-TR-96-4018, the Materials Directorate, Wright Patterson AFB OH (March 1995), recently showed the surface finish of a polished surface of a commercial $Si_3N_4$ ball (7/16 in diameter) using an AFM, an Ra in the region without defects as 1.8–2.8 nm and the regions including the defects as 11–18 nm (with defect density medium and scratch marks severe). For smaller size balls (¼ in diameter), they reported an Ra of 2.5 to 4 nm in the region without any defects and 35–40 nm including the regions with defects (with defect density large and scratch marks some). However, the Rmax with defects can be many times this value (at least 10 times). FIG. 3 is an AFM image at higher magnification showing deep pits separated by smooth regions of a commercially finished ball.

Figure 4A:
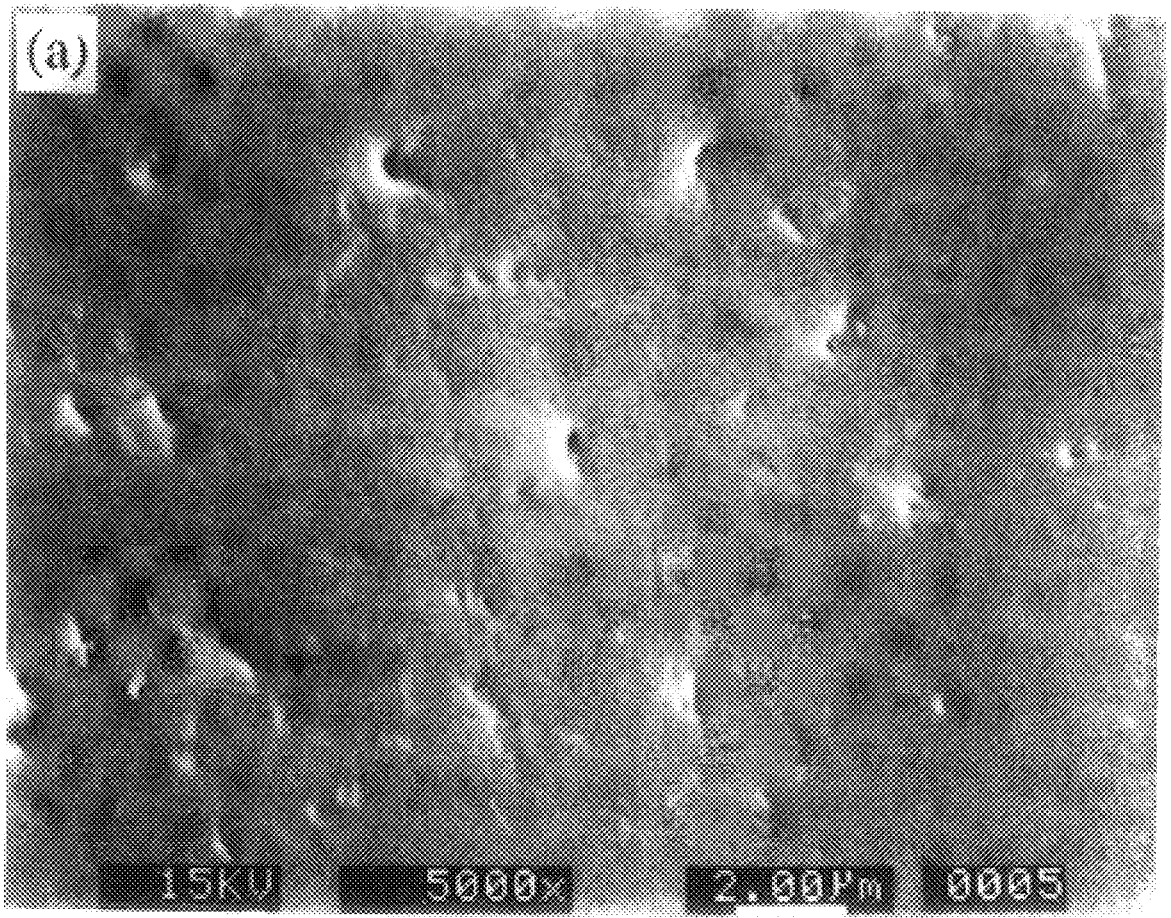
FIG. 4(a) is an SEM image of a $Si_3N_4$ ball surface finished by $Cr_2O_3$ abrasive.
Figure 5A:
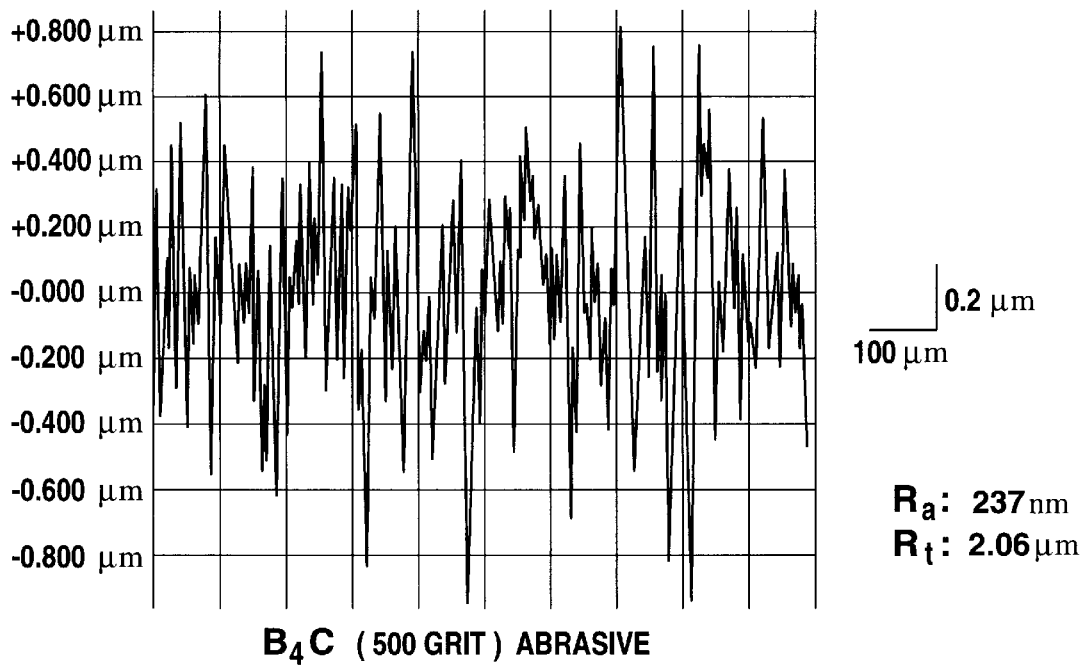
Figure 5B:
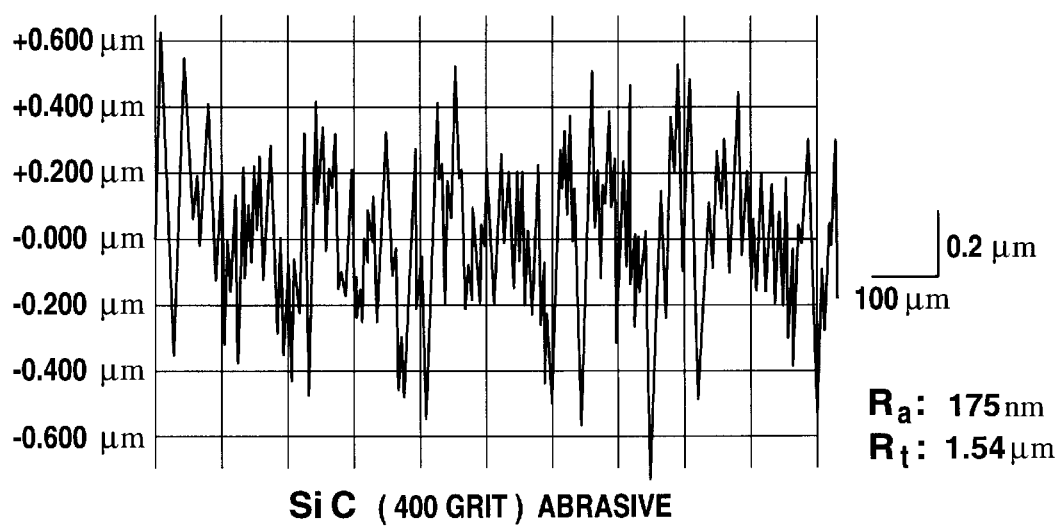
Figure 5C:
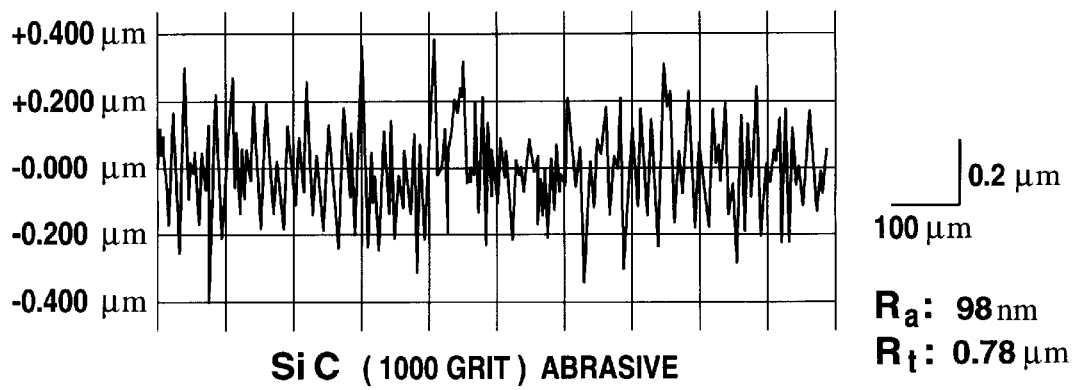
Figure 5D:
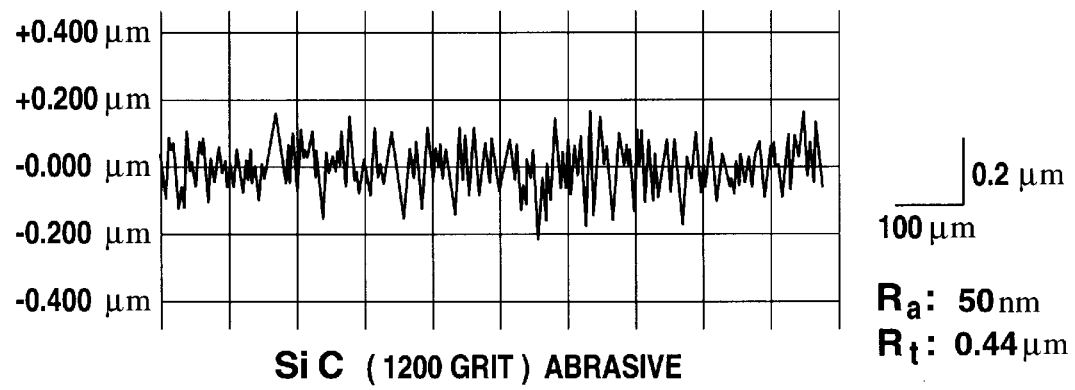
Figure 5E:
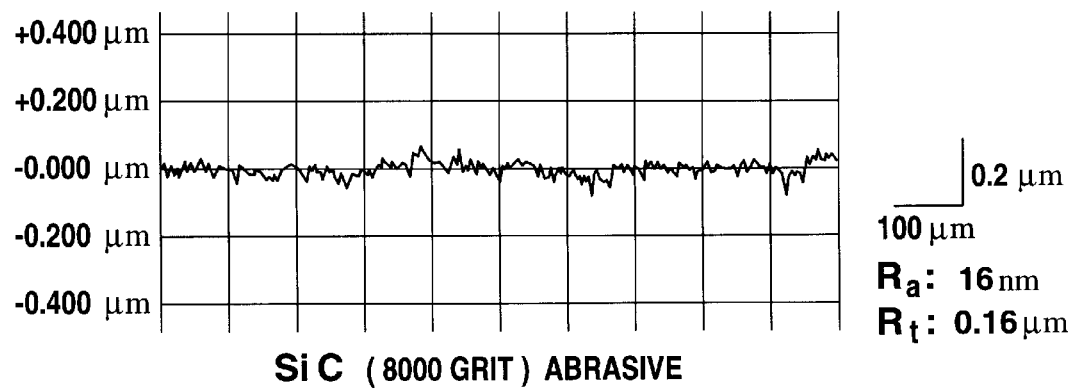

FIGS. 4(a) and (b) are an SEM micrograph and a Form TalySurf profile, respectively, of a $Si_3N_4$ ball surface finished by $Cr_2O_3$. From the SEM micrograph [FIG. 4(a)], it can be seen that while much of the the surface is very smooth there are some fine scratches and several small pits. The surface finish values obtained by the Form Talysurf are Ra=10.7 nm and Rt=0.149 μm. A plausible explanation for the observed roughness with $Cr_2O_3$ abrasive, in spite of its CMP ability, is its higher hardness (harder than $Si_3N_4$) and consequent mechanical abrasion leading to abrasion and pitting. Also, some of the species generated during CMP with $Cr_2O_3$ may require careful handling from an environmental point of view which is not the case with $CeO_2$. Hence, use of $CeO_2$ for polishing of $Si_3N_4$ would be preferable both from CMP and environmental points of view.

Table V gives the average surface finish and material removal rates obtained at progressive stages of polishing. The corresponding Talysurf surface finish profiles are shown in FIGS. 5(a)–(f). It can be seen that the surface roughness as well as the material removal rates decease as the hardness and grain size of the abrasive decreases due to a decrease in the size of brittle microfracture. For a harder abrasive with a fine grain size, the material removal is by submicroscopic fracture and therefore results in damage-free subsurface. Further CMP with a softer abrasive, such as $CeO_2$, as described in more detail below, will result in an extremely smooth surface.

TABLE V

Average Surface Finish and Material Removal Rates During Various Stages of Polishing

| Stage | Abrasive | Surface Finish (Ave.) Ra (nm) | Rt ($\mu$m) | MRR per ball mg/min | $\mu$m/min | Material Removal Mechanism |
|---|---|---|---|---|---|---|
| 1 | $B_4C$ 500 | 225 | 1.95 | 0.96 | 1.2 | Microfracture |
|  | SiC 400 | 170 | 1.40 | 0.62 | 0.8 | Microfracture |
| 2 | SiC 1000 | 95 | 0.80 | 0.35 | 0.5 | Submicro-fracture |
|  | SiC 1200 | 55 | 0.50 | 0.22 | 0.2 | Submicro-fracture |
| 3 | SiC 8000 | 15 | 0.15 | 0.04 | — | Submicro-fracture |
|  | $CeO_2$ | 4 nm | 0.03 $\mu$m | 0.01 | — | Tribo-chemical |

FIGS. 6(a) and 6(b) show the 3-D plot of the surface roughness using the ZYGO non-contacting laser interference microscope and the AFM profile, respectively of the final surface polished by softer $CeO_2$ abrasive. The surface finish values after the final polishing obtained by Form Talysurf are Ra=3.8 nm and Rt=0.029 $\mu$m, while those obtained by ZYGO are Ra=3.9 nm and Rtm=0.021 $\mu$m for the line scan and by AFM are Ra=1.4 nm and Rmax=0.018 $\mu$m for the area scan. The SEM micrographs [FIG. 7(b)] show an essentially smooth surface with practically no surface defects. Both AFM and ZGYO also provide surface finish by averaging over an area. The evaluation of surface topography by all the characterization techniques considered in these examples, namely, Talysurf, SEM, ZYGO, and AFM, gives confidence that the final surface is damage-free with a finish of Ra of about 4 nm and Rt of approximately 0.04 $\mu$m (cut-off: 0.25 mm, evaluation length: 4–6 consecutive cut-off, Filter: ISO 2CR). If one considers the AFM values, the surface finish Ra would be about 1.4 nm.

Figure 7A:
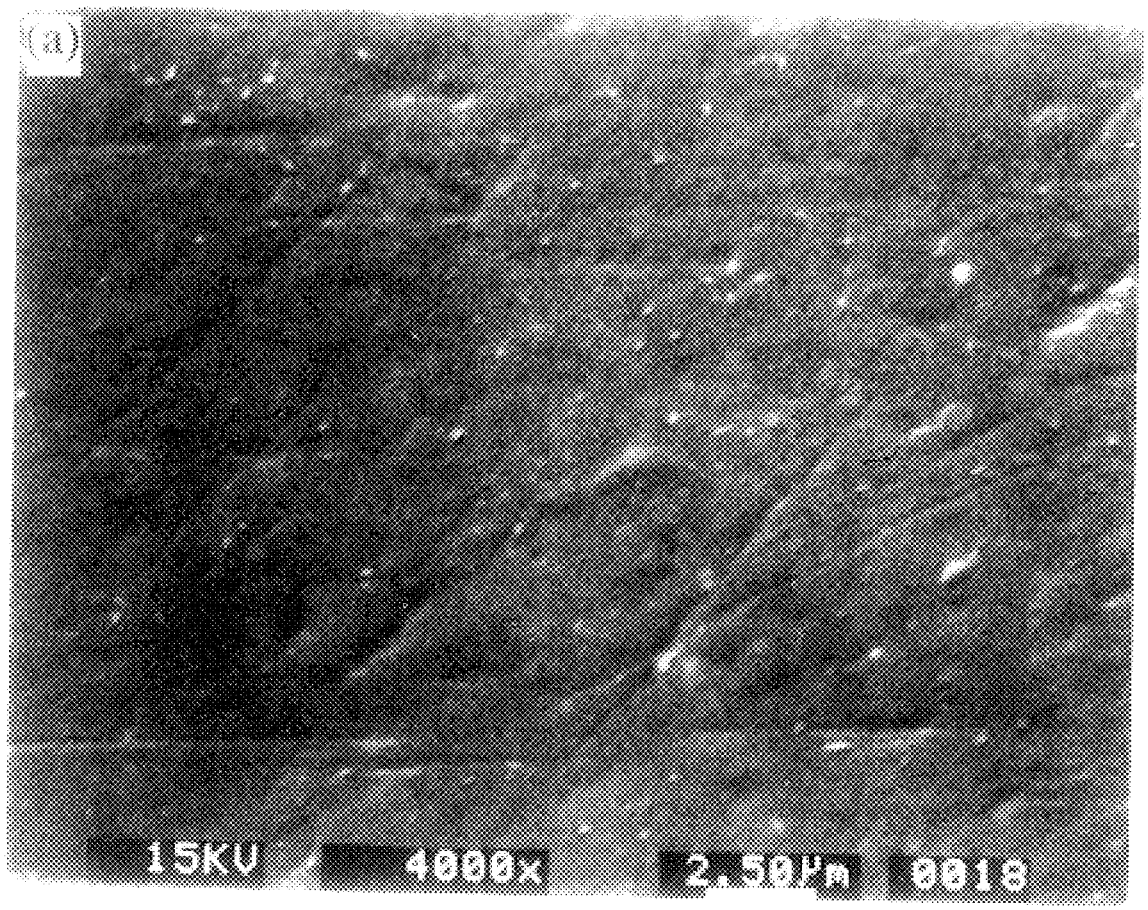
FIG. 7(a) is an SEM image of the surface of a $Si_3N_4$ ball after polishing by SiC (8000 grit) abrasive.
Figure 7B:
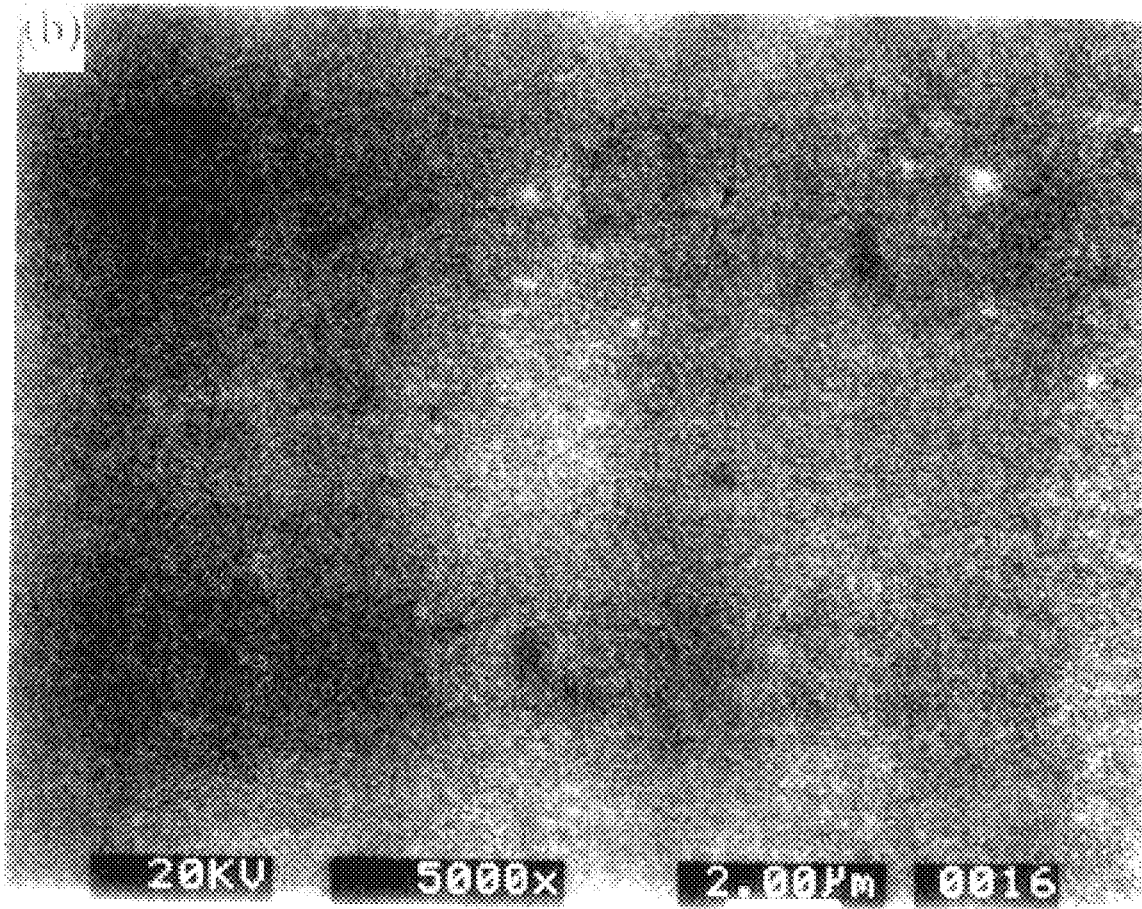
FIG. 7(b) is an SEM image of the surface of a $Si_3N_4$ ball after polishing by $CeO_2$ (5 μm) abrasive.

FIG. 7(a) is an SEM micrograph of a $Si_3N_4$ ball surface obtained after mechanical polishing with a finer SiC abrasive (8000 grit size) indicating that the material removal from the workmaterial is predominantly by brittle fracture on a submicroscopic scale under the mechanical action of the abrasive. While some polishing scratches can be seen, the surface is relatively free of pits that would normally form using diamond abrasive. FIG. 7(b) is a representative SEM micrograph of a $Si_3N_4$ ball surface after the surface has been finished by CMP with a softer abrasive, $CeO_2$, showing an extremely smooth surface with practically no surface defects, such as pits or scratch marks. Several areas of the $Si_3N_4$ ball surface were scanned and the micrograph shown in FIG. 7(b) was found to be a representative of the topography of the surface.

Figure 8A:
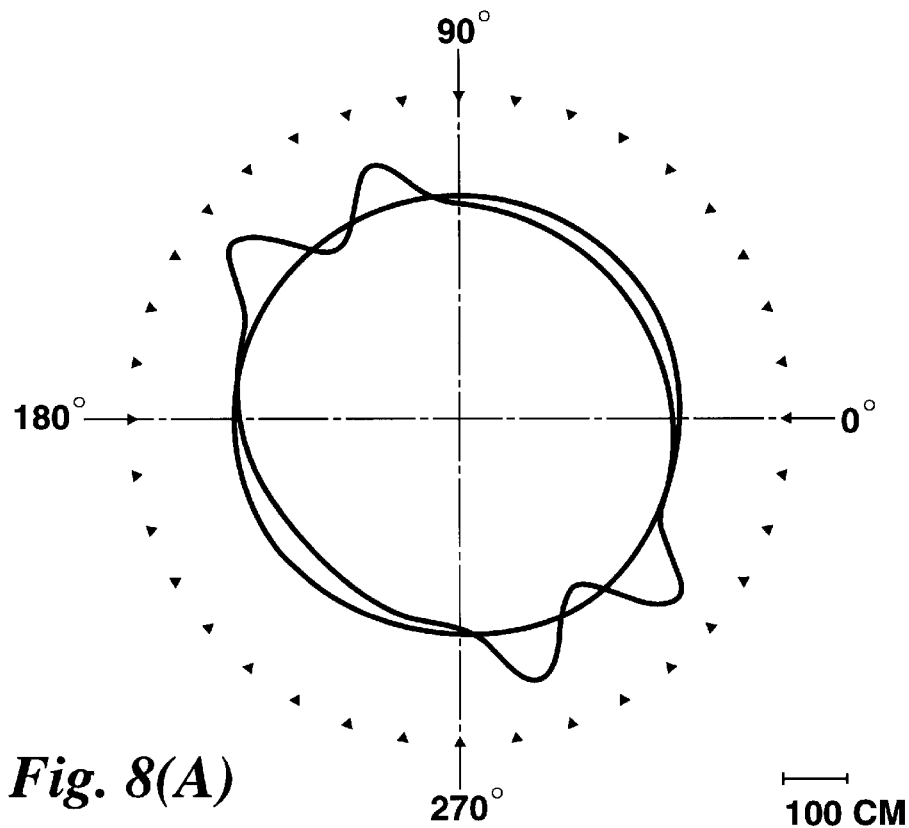
FIG. 8(a) is a TalyRond roundness profile of an as-received $Si_3N_4$ ball showing a 200 μm ×5 mm band at the parting line due to the HIP'ing process (Roundness: 195 μm).
Figure 8B:
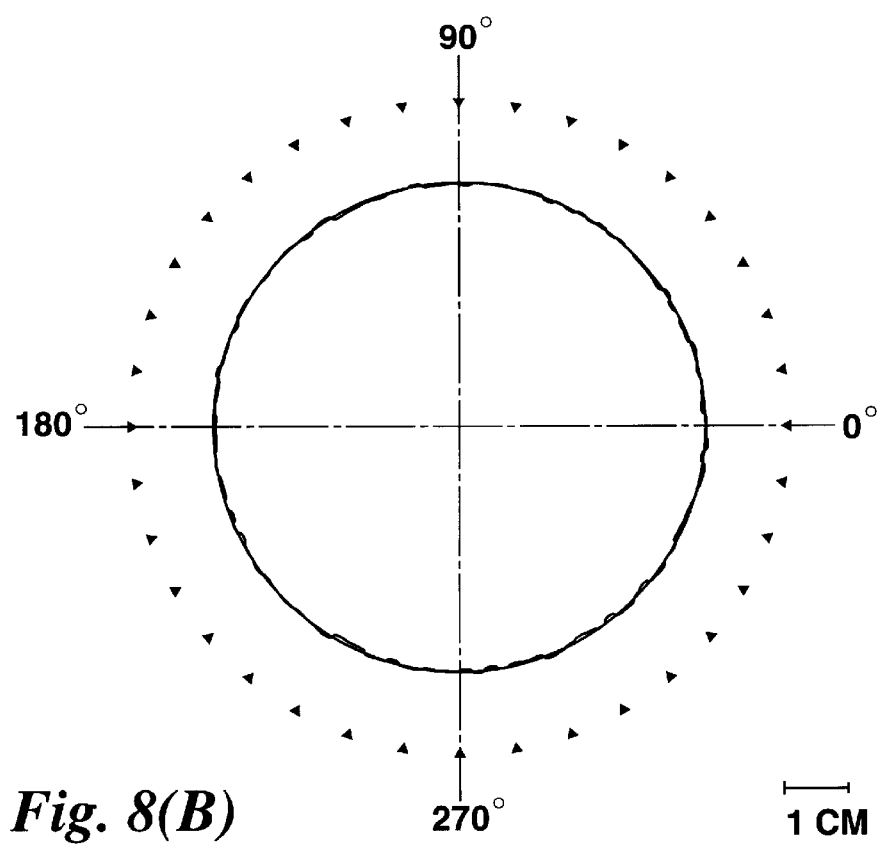
FIG. 8(b) is a TalyRond roundness profile of a $Si_3N_4$ ball after the final stage of polishing by $CeO_2$ (5 μm) abrasive (Roundness: 0.25 μm).

FIGS. 8(a) and (b) show the TalyRond roundness traces of an as-received ball and the finished ball, respectively. It shows that the roundness of the NBD-200 HIP-$Si_3N_4$ balls was reduced from the as-received condition of 200 $\mu$m to a final value of 0.25 $\mu$m. The sphericity of the balls (i.e. maximum deviation of the roundness of a ball taken in three orthogonal planes) for this batch was found to be in the range of 0.30 $\mu$m.

From these examples, it can be seen that magnetic float polishing can be used for finishing $Si_3N_4$ balls from the as-received condition to the required diameter, sphericity (<0.3 mm), and surface finish <4 nm without scratches or pits on the surface. The actual polishing process from the as-received condition to the final requirements can be achieved in less than 20 hours. The methodology developed here incorporates polishing conditions and use of appropriate abrasives (including grain sizes) that are not severe enough at any stage to cause damage, such as deep pits and cracks in and near the surface, so that the balls can be finished to the requirements without surface or near surface damage. Of course, whether or not the surface can be finished absolutely smooth also depends on the residual porosity of the HIP-$Si_3N_4$ material.

In the initial stage of the process of the present invention, the mechanism of material removal from the $Si_3N_4$ balls by finer grit, harder abrasives, such as $B_4C$ and SiC in the MFP process is by mechanical microfracture because of higher hardness of the abrasive and the inherent hardness of the workmaterial. Under these conditions material removal occurs not by grain pullout, grain fracture, and large fracture but by mcirofracture by cleavage. While chemo-mechanical action may also occur, its contribution is considered to be much smaller than the mechanical action, namely, microfracture by cleavage.

For larger sized abrasives and higher loads, as in conventional polishing with diamond abrasive, the finished surface is effected by the formation of deep pits, grooves and cracks. This will not be the case with finer abrasives and lighter loads. Higher material removal rates without subsurface damage is feasible by magnetic float polishing because of high polishing speeds and very flexible float system used. The low loads used (1N/ball), while causes microcracking by cleavage, is small enough as to not cause larger cracks, or dislodge grains by grain pullout.

As opposed to mechanical action, the final stage of the process of the present invention involves chemo-mechanical polishing. This is accomplished with a chemo-mechanical polishing agent having a hardness similar to that of the $SiO_2$ layer chemically formed on the workmaterial but significantly less than that of the workmaterial itself. Cerium oxide is preferred as the hardness of $CeO_2$ is close to the $SiO_2$ layer but significantly lower ($\approx\frac{1}{3}$) than $Si_3N_4$ workmaterial. Thus, $SiO_2$ reaction layers formed during chemical action are removed without damaging $Si_3N_4$ workmaterial by $CeO_2$ In general, Mohs hardness for best polishing abrasives for glasses ($SiO_2$) is $\approx$6.5. The hardness of $CeO_2$ abrasive is $\approx$6 on the Moh's scale and the pH of the magnetic fluid plus $CeO_2$ is $\approx$6. The kinetic action, which removes the reaction products from the interface is very important in the CMP process. The chemical reaction can continue only after the passivating layers are removed by the mechanical action. Table VI shows the properties of $CeO_2$ polishing medium utilized in the given examples. The $Si_3N_4$ balls were initially polished with a SiC #8000 (1 $\mu$m) abrasive prior to CMP. The polishing conditions are listed in Table VII. The pH value of polishing solution [a water-based magnetic fluid (W-40) plus 10 vol. % $CeO_2$ polishing media is $\approx$6.

TABLE VI

Properties of $CeO_2$ Polishing Medium

| PROPERTY | VALUE |
|---|---|
| Hardness, Mohs | 6 |
| Density, $g/cm^2$ | 7.13 |
| Elastic Modulus, GPa | 165 |
| Poisson's Ratio | 0.5 |
| Thermal Conductivity at 100° C., W/m-K | 8.4 |
| Thermal Conductivity at 1000° C., W/m-K | 0.8 |

TABLE VII

Test Conditions

| | |
|---|---|
| Workmaterial | HIP'ed $Si_3N_4$ balls (CERBEC) |
| | Diameter: 12.7 mm (0.5 inch) |
| | Initial Sphericity: 1 μm |
| | Initial Finish: Ra = 20 nm |
| Abrasive Concentration | 10% by volume |
| Polishing Load | 1.2N per ball |
| Polishing Speed | 2000 rpm |
| Magnetic Fluid | Water-based (W-40) |
| | Saturation Magnetization |
| | at 25° C.: 400 Gauss |
| | Viscosity at 27° C.: 25 Cp |

It is well known that $Si_3N_4$ can be readily oxidized in an oxidizing atmosphere. As a result, the surfaces of the as-received HIP'ed $Si_3N_4$ balls are invariably covered with a thin layer of silica (see Eqn. 1 Table below). For a reaction to occur spontaneously at a given temperature, T, the Gibbs free energy change, $\Delta G$ should be negative. In the equations that follow, various chemical reactions of interest, the temperature under consideration, T (from 0–1000° C.), and the corresponding free energy change, $\Delta G$ are given.

$$Si_3N_4 + 3O_2(g) = 3SiO_2 + 2N_2(g) \quad (1)$$

| T (° C.) | 0 | 100 | 200 | 300 | 400 | 600 | 800 | 900 |
|---|---|---|---|---|---|---|---|---|
| $\Delta G$ (kcal) | −460.7 | −455.4 | −450.3 | −445.2 | −440.2 | −430.6 | −412.3 | −412.4 |

During the mechanical polishing of $Si_3N_4$ by a harder abrasive, such as SiC and $B_4C$, the silica surface layer along with a portion of $Si_3N_4$ is removed by brittle fracture or abrasion, thus exposing the base $Si_3N_4$. In subsequent CMP, $Si_3N_4$ can react with water (hydrolysis) (from the water-based magnetic fluid) leading to the formation of $SiO_2$ and $NH_3$ (Eqn. 2).

$$Si_3N_4 + 6H_2O = 4NH_3(g) \quad (2)$$

| T (° C.) | 0 | 100 | 200 | 300 | 400 | 600 | 800 | 1000 |
|---|---|---|---|---|---|---|---|---|
| $\Delta G$ (kcal) | −132.7 | −140.9 | −147.4 | −512.6 | −156.4 | −159.8 | −156.9 | −146.5 |

Figure 9:
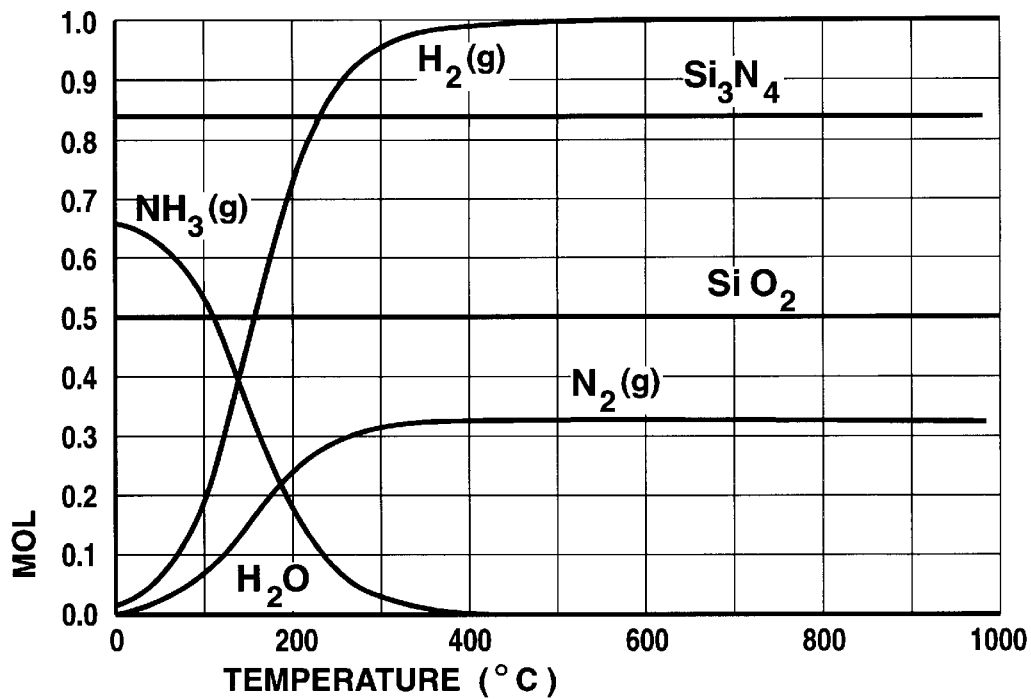
FIG. 9(a) is a graphic depiction of the variation of the mole fractions of various chemical species with the temperature of the chemical reaction system consisting of 1 mol of $Si_3N_4$ and 1 mol of $H_2O$.
FIG. 9(b) is a graphic depiction of the variation of various chemical species with temperature for 1 mol of $Si_3N_4$ and increasing amounts of $H_2O$.
Figure 9:
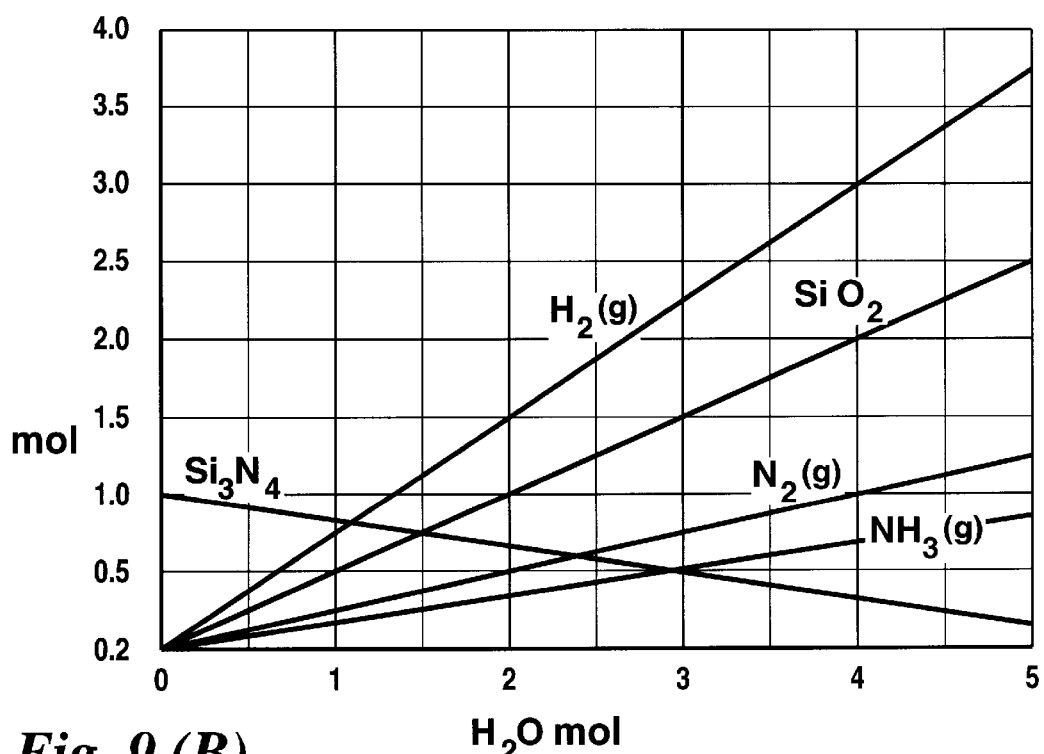

FIG. 9(a) shows the variation of the mole fraction of various species with temperature at equilibrium based on the thermodynamic calculations of the chemical reaction system consisting of 1 mol of $Si_3N_4$ and 1 mol of $H_2O$. It can be seen from the figure that at low temperatures (<300° C.), $NH_3(g)$ formation is promoted while at higher temperatures, $H_2(g)$ and $N_2(g)$ gases are evolved. The $SiO_2$ mole fraction as well as $Si_3N_4$ mole fraction, however, seems to be somewhat independent of temperature indicating very little effect, if any, of temperature on the removal rate under these conditions. FIG. 9(b) shows the variation of various chemical species with temperature for 1 mol of $Si_3N_4$ and increasing amounts of $H_2O$. It can be seen that with increase in the mole fraction of $H_2O$, the amount of $SiO_2$ increases and the amount of $Si_3N_4$ correspondingly decreases both accounting for an increase in the material removal due to chemomechanical polishing. This shows the beneficial role of $H_2O$ in CMP. In a similar manner, $NH_3(g)$, $H_2(g)$, and $N_2(g)$ gases also increase with incresease in the mole content of $H_2O$, as can be anticipated.

$$NH_{3(g)} = N_2(g) + H_2(g) \quad (3)$$

| T (° C.) | 0 | 100 | 200 | 300 | 400 | 600 | 800 | 1000 |
|---|---|---|---|---|---|---|---|---|
| $\Delta G$ (kcal) | 9.02 | 4.28 | −0.88 | −6.14 | −11.53 | −22.53 | −33.71 | −44.96 |

Eqn. 3 shows that at low temperatures, $\Delta G$ is positive indicating the unlikelihood of dissociating $NH_3(g)$ as $N_2(g)$ and $H_2(g)$. Thus $NH_3$ formation is possible in CMP only when temperature rise at the contact surface is <300° C. [Eqn. 2 and FIG. 9]. Further increase in temperature may result in the dissociation of $NH_3$ into $N_2(g)$ and $H_2(g)$ [Eqn. 3 and FIG. 9].

Figure 10:
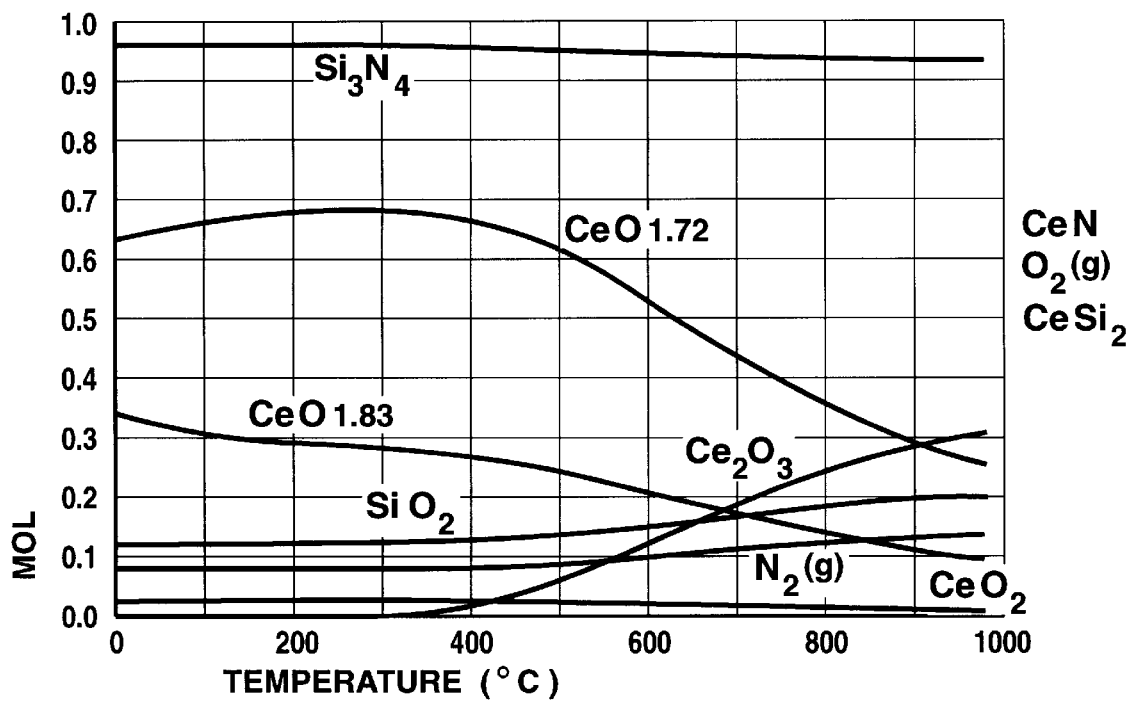
FIG. 10(a) is a graphic depiction of the variation of the reaction products with temperature of the chemical reaction system consisting of 1 mol of $Si_3N_4$ and 1 mol of $CeO_2$.
FIG. 10(b) is a graphic depiction of the variation of the reaction products with increasing mole fraction of $CeO_2$.
Figure 10:
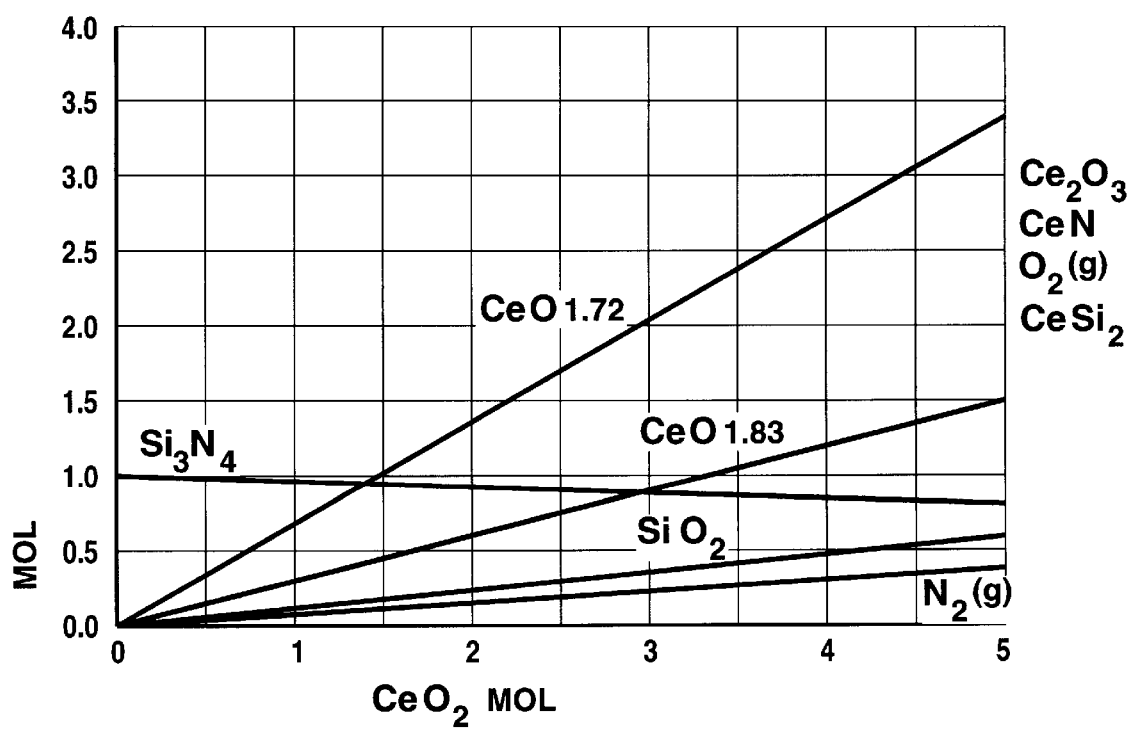

$CeO_2$ can also react directly with $Si_3N_4$ (oxidization-reduction reaction) forming $SiO_2$ and $N_2$ as reaction products. It may be noted that $CeO_2$ is not stable and will convert to $CeO_{1.72}$ and $CeO_{1.83}$ at low temperatures and to the more stable form, namely, $Ce_2O_3$ at higher temperatures. FIG. 10(a) shows the variation of the reaction products with temperature at equilibrium based on the thermodynamic calculations of the chemical reaction system consisting of 1 mol of $Si_3N_4$ and 1 mol of $CeO_2$ and FIG. 10(b) is for 1 mol of $Si_3N_4$ and with increasing mole fractions of $CeO_2$. From FIG. 10(a) it can be seen that the $SiO_2$ mole fraction is independent of temperature up to ≈300° C. and increases gradually up to 1000° C. Thus temperature does not seem to be as effective as mole fraction of $H_2O$ [compare FIG. 10(a) with FIG. 9(b)]. However, as the mole fraction of $CeO_2$ is increased, the amount of $SiO_2$ increases and the amount of $Si_3N_4$ decreases both accounting for the increase in the material removal rate due to CMP.

Figure 11:
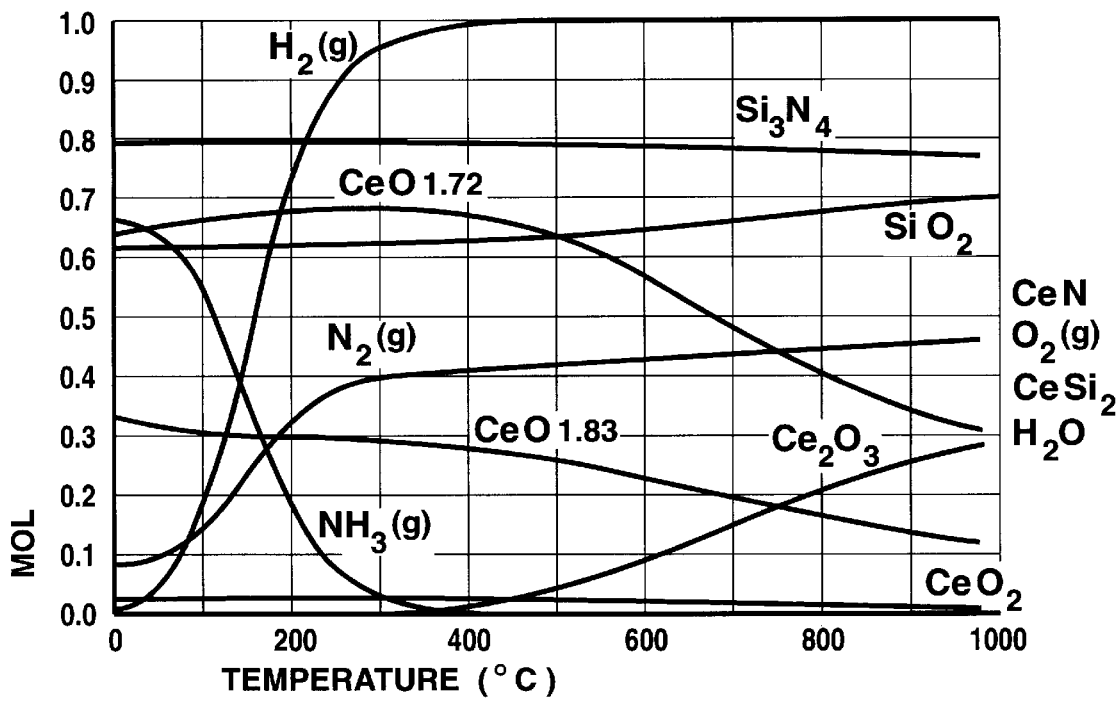
FIG. 11 is a graphic depiction of the variation of the reaction products with temperature for the chemical reaction system of 1 mol of $Si_3N_4$, 1 mol of $CeO_2$, and 1 mol of $H_2O$.

FIG. 11 shows the variation of the reaction products with temperature for the chemical reaction system consisting of 1 mol of $Si_3N_4$, 1 mol of $CeO_2$, and 1 mol of $H_2O$ at equilibrium based on the thermodynamic calculations. This diagram provides an insight on the mechanism of chemo-mechanical polishing of $Si_3N_4$ with $CeO_2$ showing various chemical species that can be formed during the process. This figure can be considered as a combination of FIGS. 9(a) and 10(a). It shows that while the $SiO_2$ mole fraction is constant up to ≈300° C., it increases with further increase in temperature. A reverse trend can be seen for $Si_3N_4$, i. e. initially constant followed by a decrease in mole fraction with further increase in temperature, both indicating an increase the material removal rate due to chemo-mechanical action at higher temperatures. It can be seen from the figure that $NH_3(g)$ forms at low temperatures (<300° C.) while $H_2(g)$ and $N_2(g)$ gases form at higher temperatures, similar to FIG. 9(a).

Figure 12:
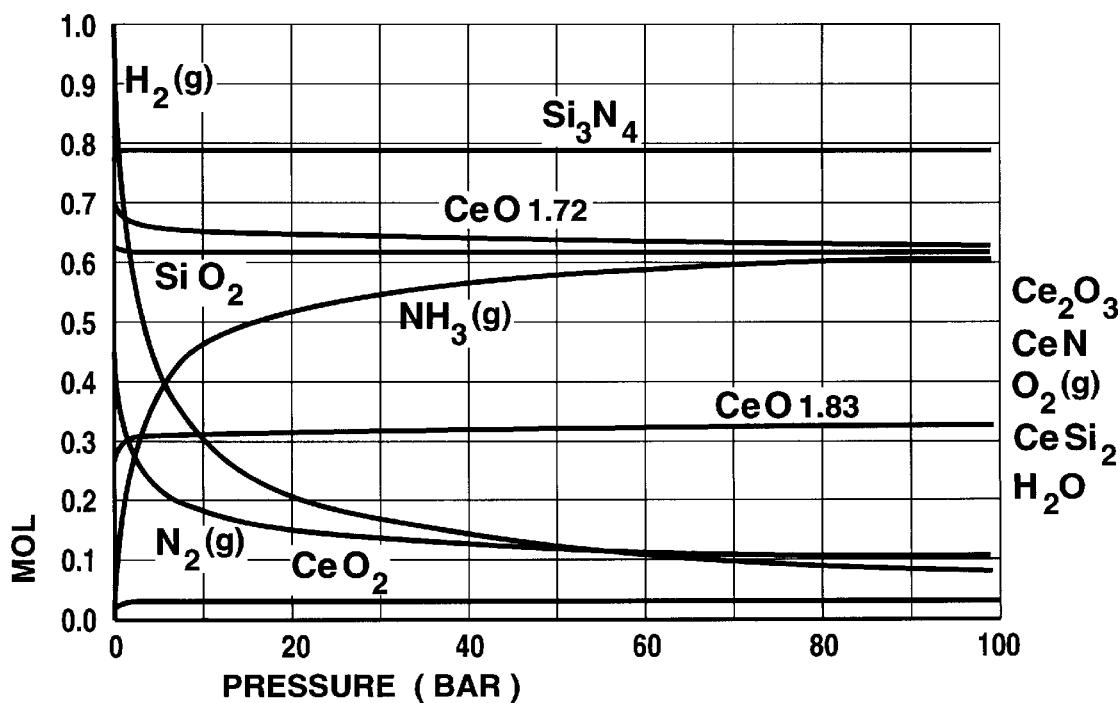
FIG. 12 is a graphic depiction of the variation of the reaction products with pressure for the chemical reaction system of 1 mol of $Si_3N_4$, 1 mol of $CeO_2$, and 1 mol of $H_2O$.

FIG. 12 shows the variation of the reaction products with pressure at equilibrium based on the thermodynamic calculations of the chemical reaction system of 1 mol of $Si_3N_4$, 1 mol of $CeO_2$, and 1 mol of $H_2O$. It can be seen that both $Si_3N_4$ and $SiO_2$ more or less remains constant indicating that the formation of $SiO_2$ due to chemical reaction is independent of the polishing pressure. It may be noted that an increase in the mole fraction of $SiO_2$ and a corresponding decrease in $Si_3N_4$ are an indication of the increase in the material transformed by chemical action. However, the actual material removal will depend on pressure or kinetic action involving the removal of the reaction products to enable the chemical reaction to continue ad infinitum.

$CeO_2$ thus appears to be the most effective polishing medium for CMP of $Si_3N_4$ because of the thermodyamic considerations of its reaction with $Si_3N_4$ as well as its kinetic action of removing the reaction product, namely, $SiO_2$ from $Si_3N_4$ workmaterial.

The present invention as thus described replaces completely (both roughing and finishing) conventional polishing starting from the as-received balls and completely finishing them to the final specifications in the same apparatus. This methodology for finishing $Si_3N_4$ balls achieves an actual finishing time an order of magnitude or more faster than conventional polishing. Magnetic float polishing combining mechanical and CMP is an efficient and cost effective manufacturing technology for producing high quality $Si_3N_4$ balls for bearing applications due to high polishing speed, small and controlled polishing force, flexible support, and chemo-mechanical action. High material removal rates (1 μm/min) with minimal subsurface damage are possible to achieve in an initial stage using harder abrasives, such as $B_4C$ or SiC due to rapid accumulation of minute amounts of material removed by mechanical microfracture at high polishing speeds and low loads in the MFP process. Although material removal is by brittle fracture, it occurs on a microscale due to low polishing force, flexible float system, and fine abrasives. The cracks generated are localized and suppressed from propagating into microcracks. Consequently subsurface damage is minimized leading to the higher strength of the workmaterial and reliability of the parts in service. Using the softer, chemo-mechanical abrasive in a finishing stage produces a final surface finish which is extremely smooth and damage free.

Another advantage of the present invention is that it is capable of finishing a small batch (10–20 balls) to the finished requirements without the need for sorting them from a large batch of balls or use different equipment as in conventional lapping. This is beneficial especially when small batches are needed for specific low volume applications or for evaluation of materials in the development of new materials for bearing applications.

Time is also saved with the present invention. The semi-finishing and finishing stages can be accomplishing in about 4 hours. The roughing stage depends on the amount of material to be removed from the as-received condition to the final requirements. In any case, a batch of balls can be finished in about 16 to 20 hours compared to several weeks by conventional polishing. Also, diamond abrasive is not required for the process. Faster polishing times and use of abrasives other than diamond would significantly reduce the overall costs of manufacture of $Si_3N_4$ balls for bearing applications. Furthermore, the implementation of this technology would not be very capital intensive as it can be used by modifying the existing equipment.

While the invention has been described with a certain degree of particularity, it is manifest that many changes may be made without departing from the spirit and scope of the invention. It is understood that the invention is not limited to the embodiment(s) set for herein for purposes of exemplification, but is to be limited only by the scope of the attached claim or claims, including the full range of equivalency to which each element thereof is entitled.

What is claimed is:

1. A process for finishing a workpiece to a desired size, sphericity and surface roughness, comprising placing the workpiece in a float chamber of a magnetic fluid polishing apparatus in contact with an appropriate quantity of magnetic fluid, said magnetic fluid containing an effective amount of a chemo-mechanical abrasive agent capable of forming a reaction layer upon said workpiece, said chemo-mechanical abrasive agent being of a hardness similar to that of the reaction layer but less than that of said workpiece, and polishing said workpiece to the desired specifications.

2. The process according to claim 1 where-in said chemo-mechanical abrasive agent is of a conventional hardness on a linear scale, of about ⅓ that of said workpiece.

3. The process according to claim 1 wherein said chemo-mechanical abrasive agent is $CeO_2$.

4. A process for finishing a workpiece to a desired size, sphericity and surface roughness, comprising:

(a) placing the workpiece in a float chamber of a magnetic fluid polishing apparatus in contact with an appropriate quantity of magnetic fluid, said magnetic fluid containing an effective amount of an abrasive agent;

(b) in an initial polishing stage to achieve high removal rates with minimal subsurface damage, polishing said workpiece at a load of approximately 1N utilizing a first selected abrasive agent of a relatively coarse grit (400–500) and of a hardness greater than that of the workpiece at a high speed in the range of 2000–4000 rpm;

(c) in an intermediate or semifinishing stage to achieve a desired sphericity, polishing said workpiece at a load of approximately 1N utilizing a second selected abrasive agent of a finer grit size than said first selected abrasive agent and of a hardness greater than that of said workpiece at a speed in the range of 1000–2000 rpm; and (d) in a final stage to achieve a desired surface finish, finishing said workpiece utilizing a chemo-mechanical abrasive agent having a hardness lower than that of said workpiece.

5. The process according to claim 4 wherein said workpiece comprises a hard and brittle workmaterial including ceramics and glasses.

6. The process according to claim 4 wherein said workpiece comprises a ceramic workmaterial selected from the group consisting of $Si_3N_4$, SiC, $ZrO_2$, $Al_2O_3$ and ceramic composites.

7. The process according to claim 6 wherein said workpiece comprises $Si_3N_4$.

8. The process according to claim 4 wherein said first selected abrasive agent is selected from the group consisting of $B_4C$ and SiC.

9. The process according to claim 8 wherein said second selected abrasive agent is selected from the group consisting of $B_4C$ and SiC.

10. The process according to claim 4 wherein said chemo-mechanical abrasive agent is selected from the group consisting of $CeO_2$, $CaCO_3$, MgO, $SiO_2$, $Fe_2O_3$, $Fe_3O_4$ and $Cr_2O_3$.

11. The process according to claim 10 wherein said chemo-mechanical abrasive agent is $CeO_2$.

12. The process according to claim 4 wherein said workpiece is an $Si_3N_4$ ball and said chemo-mechanical abrasive agent is $CeO_2$.

* * * * *

UNITED STATES PATENT AND TRADEMARK OFFICE
CERTIFICATE OF CORRECTION

PATENT NO. : 5,931,718
DATED : August 3, 1999
INVENTOR(S) : Ranga Komanduri and Ming Jiang It is certified that error appears in the above-identified patent and that said Letters Patent is hereby corrected as shown below:

Col. 4, lines 17-18
  delete in its entirety the sentence referring to FIG. 6(a).

Figure 6:
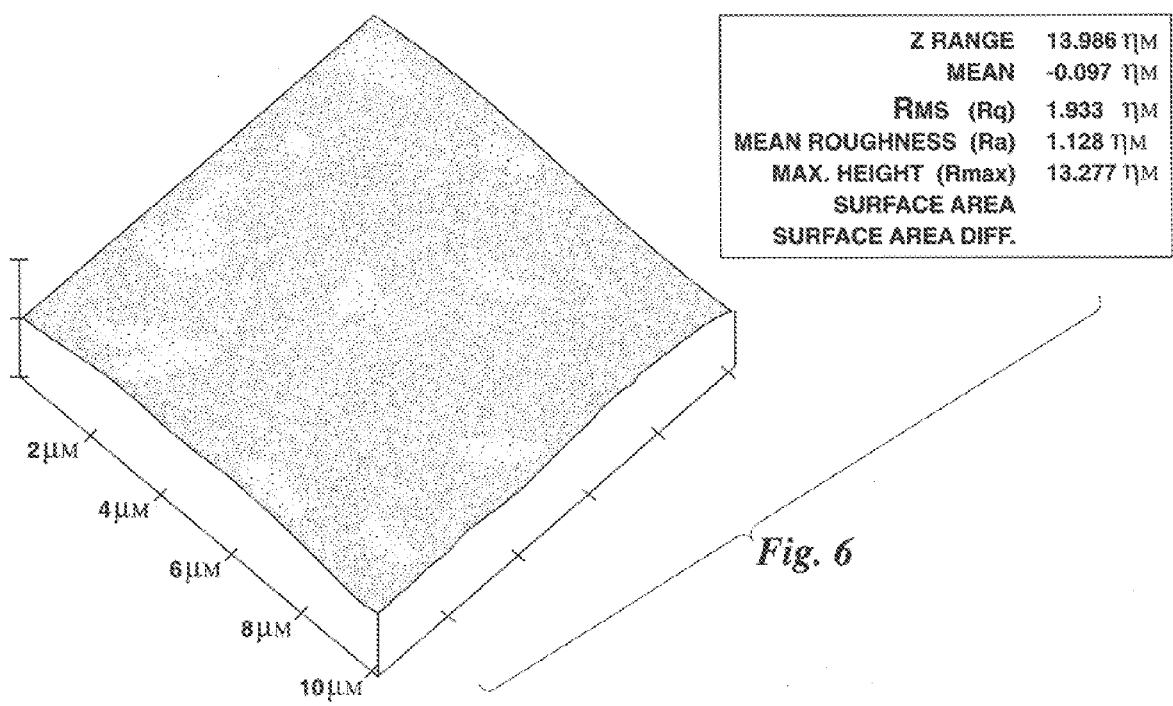
FIG. 6(a) is a ZYGO plot (100×Fizeau) of the surface of a $Si_3N_4$ ball after finishing by $CeO_2$ (5 μm) abrasive.
FIG. 6(b) is an AFM image of the surface of a $Si_3N_4$ ball after finishing by $CeO_2$ (5 μm) abrasive.

Col. 4, line 19
  Replace "FIG. 6(b)"
  With -- FIG. 6 --.

Col. 11, lines 32-35
  Replace the sentence beginning with "FIGS. 6(a) and 6(b)..."
  With -- FIG. 6 shows an AFM profile of the final surface polished by softer $CeO_2$ abrasive.--

Signed and Sealed this

Seventeenth Day of April, 2001

*Attest:*

NICHOLAS P. GODICI

*Attesting Officer*  *Acting Director of the United States Patent and Trademark Office*